(12) United States Patent
Chang et al.

(10) Patent No.: US 10,922,844 B2
(45) Date of Patent: Feb. 16, 2021

(54) IMAGE POSITIONING METHOD AND SYSTEM THEREOF

(71) Applicant: Industrial Technology Research Institute, Hsinchu (TW)

(72) Inventors: Shu-Hsin Chang, Tainan (TW); Kun-Hsien Lu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/698,929

(22) Filed: Nov. 27, 2019

(65) Prior Publication Data

US 2020/0311979 A1    Oct. 1, 2020

(30) Foreign Application Priority Data

Mar. 28, 2019   (TW) .............................. 108110928 A

(51) Int. Cl.
*G06T 7/70* (2017.01)
*G06T 7/80* (2017.01)

(52) U.S. Cl.
CPC ................. *G06T 7/80* (2017.01); *G06T 7/70* (2017.01); *G06T 2207/30244* (2013.01)

(58) Field of Classification Search
CPC .... G06T 7/70; G06T 7/80; G06T 2207/30244
See application file for complete search history.

(56) References Cited

U.S. PATENT DOCUMENTS

| 6,028,584 A * | 2/2000 | Chiang | G06T 3/0062 345/628 |
| 8,330,818 B2 * | 12/2012 | Cheng | G06T 7/246 348/144 |
| 8,395,663 B2 * | 3/2013 | Hsieh | G01S 5/16 348/139 |

(Continued)

FOREIGN PATENT DOCUMENTS

| CN | 106780602 | 5/2017 |
| TW | 201123076 | 7/2011 |

(Continued)

OTHER PUBLICATIONS

"Office Action of Taiwan Counterpart Application," dated Jan. 17, 2020, p. 1-p. 6.

(Continued)

*Primary Examiner* — Brian P Yenke
(74) *Attorney, Agent, or Firm* — JCIPRNET

(57) ABSTRACT

An image positioning method having following steps is provided. The steps include: obtaining world coordinates of two reference points and image coordinates of two projection points corresponding to the two reference points; calculating a plurality of coordinate transformation parameters relative to transformation between any image coordinates and any world coordinates corresponding to a camera according only to the world coordinates of the two reference points, the image coordinates of the two projection points, and world coordinates of the camera; obtaining an second image having an object image corresponding to an object (Continued)

through the camera; and positioning world coordinates of the object according to the coordinate transformation parameters.

18 Claims, 8 Drawing Sheets

(56) References Cited

U.S. PATENT DOCUMENTS

| | | | | |
|---|---|---|---|---|
| 8,588,471 | B2* | 11/2013 | Hsieh | G06K 9/00201 |
| | | | | 382/106 |
| 8,885,049 | B2* | 11/2014 | Miksch | H04N 17/002 |
| | | | | 348/118 |
| 9,749,594 | B2* | 8/2017 | Huang | H04N 7/181 |
| 9,875,542 | B2* | 1/2018 | Ikeda | G06T 7/80 |
| 10,032,274 | B2* | 7/2018 | Nakai | G06T 7/536 |
| 10,102,647 | B2* | 10/2018 | Yamaguchi | G06T 7/70 |
| 10,127,687 | B2* | 11/2018 | Matsuzawa | G06T 7/80 |
| 10,254,118 | B2* | 4/2019 | Roumeliotis | G01C 21/165 |
| 10,282,915 | B1* | 5/2019 | Lin | G02B 27/0101 |
| 10,372,970 | B2* | 8/2019 | Wang | H04N 13/261 |
| 10,373,035 | B2* | 8/2019 | Skans | H04M 1/72522 |
| 2015/0036888 | A1* | 2/2015 | Weisenburger | G06T 7/80 |
| | | | | 382/107 |
| 2016/0196643 | A1 | 7/2016 | Bendall | |
| 2016/0217318 | A1 | 7/2016 | Hayasaka | |
| 2016/0364867 | A1* | 12/2016 | Moteki | G06T 7/73 |
| 2017/0177980 | A1* | 6/2017 | Alibay | G06K 9/6289 |
| 2017/0289526 | A1* | 10/2017 | Sasatani | H04N 13/302 |
| 2019/0019341 | A1* | 1/2019 | Li | G06T 7/30 |
| 2019/0066334 | A1* | 2/2019 | Gu | G06T 7/20 |
| 2019/0147625 | A1* | 5/2019 | Jia | H04N 5/247 |
| | | | | 348/187 |
| 2019/0311494 | A1* | 10/2019 | Ramalingam | G06K 9/6268 |
| 2019/0337344 | A1* | 11/2019 | Yu | H04N 5/2253 |
| 2019/0378294 | A1* | 12/2019 | Zhang | G06T 7/80 |
| 2020/0007836 | A1* | 1/2020 | Matsuzawa | H04N 13/246 |
| 2020/0027243 | A1* | 1/2020 | Ziegler | H04N 13/246 |
| 2020/0193628 | A1* | 6/2020 | Chakraborty | G06K 9/6262 |
| 2020/0211225 | A1* | 7/2020 | Nie | G01C 25/00 |
| 2020/0357141 | A1* | 11/2020 | Zhou | G06T 7/593 |

FOREIGN PATENT DOCUMENTS

| | | |
|---|---|---|
| TW | I544148 | 8/2016 |
| TW | I562099 | 12/2016 |
| TW | 201719120 | 6/2017 |

OTHER PUBLICATIONS

Zhengyou Zhang, "A Flexible New Technique for Camera Calibration, " IEEE Transactions on Pattern Analysis and Machine Intelligence, vol. 2 No. 11, Nov. 2000, pp. 1330-1334.

Jun-Sik Kim et al., "Geometric and Algebraic Constraints of Projected Concentric Circles and Their Applications to Camera Calibration," IEEE Transactions on Pattern Analysis and Machine Intelligence, vol. 27, No. 4, Apr. 2005, pp. 637-642.

Zhengyou Zhang, "Camera Calibration with One-Dimensional Objects," IEEE Transactions on Pattern Analysis and Machine Intelligence, vol. 26, No. 7, Jul. 2004, pp. 892-899.

Radu Orghidan et al., "Camera calibration using two or three vanishing points," Proceedings of the Federated Conference on Computer Science and Information Systems, Jan. 2012, pp. 123-130.

Arturo De La Escalera et al., "Automatic Chessboard Detection for Intrinsic and Extrinsic Camera Parameter Calibration, " Sensors, vol. 10, No. 3, Mar. 2010, pp. 2027-2044.

Lei Tan et al., "Automatic Camera Calibration Using Active Displays of a Virtual Pattern, " Sensors, vol. 17, No. 4, Mar. 2017, pp. 1-13.

* cited by examiner

IMAGE POSITIONING METHOD AND SYSTEM THEREOF

CROSS-REFERENCE TO RELATED APPLICATION

This application claims the priority benefit of Taiwan application no. 108110928, filed on Mar. 28, 2019. The entirety of the above-mentioned patent application is hereby incorporated by reference herein and made a part of this specification.

BACKGROUND

Technical Field

The disclosure relates to a positioning technology, and more particularly, the disclosure relates to an image positioning method and system thereof.

Description of Related Art

Along with technology advancement, the function of cameras configured to obtain images is no longer limited to preservation of the images. Nowadays, cameras may further transform real world coordinates (world coordinates) of objects to image plane coordinates (image coordinate) of the cameras to detect, track, and position the objects. Cameras are thereby applied to the field of computer vision, such as smart video surveillance, robot vision, vehicle vision and the like.

In order to allow accurate transformation of object position between the world coordinates and the image coordinates, camera calibration becomes an important issue in the field of computer vision. Camera calibration is configured to obtain the intrinsic parameters and the extrinsic parameters of the cameras.

Generally, the model-based calibration performed through a calibration object, for example, is commonly used as a camera calibration method. In this method, calibration is required to be performed through space point information of a specific calibration pattern of one-dimension, two-dimension, or three-dimension presented in multiple frames. Nevertheless, if the one-dimensional calibration pattern is adopted, merely the relative geometry and intrinsic parameters are calculated. If the three-dimensional calibration pattern is adopted, a calibration result of high accuracy may be obtained; nevertheless, costs and complexity of manufacturing three-dimensional calibration objects are significant. As such, the two-dimensional calibration pattern is adopted most of the time. Nevertheless, in the two-dimensional calibration pattern, calibration is required to be made through at least six pieces of space point information on the object and the relative camera image information.

Another camera calibration method is self-calibration which does not rely on any object. In this method, neither calibration object nor camera coordinate information is adopted. Instead, a camera is moved, so that the corresponding point information on multiple image frames in the static scene is obtained for calculation. Nevertheless, owing to limitations of the method itself, only the intrinsic parameters of the cameras are calculated, and as such, this method may not be applied to related applications of image space positioning. Therefore, how to strike a balance between costs and accuracy is an important issue in this field.

SUMMARY

The disclosure provides an image positioning method and an image positioning system to allow a camera to perform camera calibration through reference points in the space and obtain positioning information of an object according to a calibration result.

The disclosure provides an image positioning method having the following steps. World coordinates of two reference points and image coordinates of two projection points corresponding to the two reference points are obtained. A plurality of coordinate transformation parameters relative to transformation between any image coordinates and any world coordinates corresponding to a camera are calculated according only to the world coordinates of the two reference points, the image coordinates of the two projection points, and world coordinates of the camera. A second image having an object image corresponding to an object is obtained through a camera. World coordinates of the object are positioned according to the coordinate transformation parameters.

An embodiment of the disclosure further provides an image positioning system. The image positioning system includes a camera, a storage unit, and a processor. The storage unit stores a plurality of coordinate transformation parameters. The processor is connected to the camera and the storage unit. The processor obtains world coordinates of two reference points and image coordinates of two projection points corresponding to the two reference points and calculates a plurality of coordinate transformation parameters relative to transformation between any image coordinates and any world coordinates corresponding to the camera according only to the world coordinates of the two reference points, the image coordinates of the two projection points, and world coordinates of the camera. The processor further obtains a second image having an object image corresponding to an object. The processor positions world coordinates of the object according to the coordinate transformation parameters.

To sum up, in the image positioning method and the image positioning system provided by the disclosure, camera calibration is performed through two reference points only, and world coordinates of other objects in the image are found in the world coordinate system through the calibration result.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
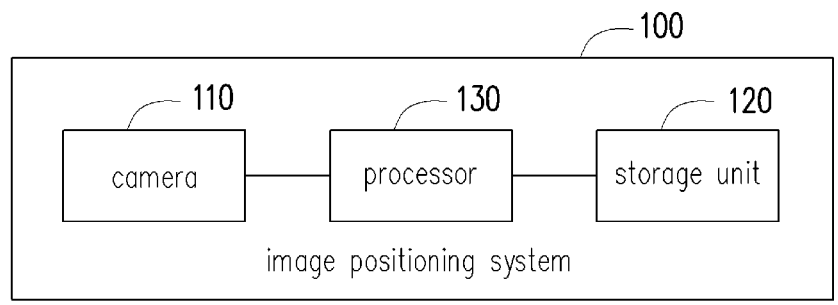
FIG. 1 is a schematic view illustrating a system of an image positioning system according to an embodiment of the disclosure.

In the description of the following embodiments, a world coordinate system and a camera coordinate system are both three-dimensional coordinate systems. A three-dimensional coordinate system is formed by the origin and the X axis, the Y axis, and the Z axis perpendicular to one another. The three-dimensional coordinate system may be a left-handed coordinate system or a right-handed coordinate system according to relative directions of the three X, Y, and Z axes. In left-handed coordinate system, the left thumb points in the positive direction of the Z axis, and the rest of the four fingers are curled towards the palm in a direction of rotating from the positive direction of the X axis to the positive direction of the Y axis. In right-handed coordinate system, the right thumb points in the positive direction of the Z axis, and the rest of the four fingers are curled towards the palm in a direction of rotating from the positive direction of the X axis to the positive direction of the Y axis. The world coordinate system and the camera coordinate system may both be the left-handed coordinate system or the right-handed coordinate system. The disclosure is not limited thereto.

The world coordinate system is a coordinate system adopted to mark a space location of an object in the real world. The positive direction of the Z axis in this coordinate system is the direction penetrating up from the core of the earth through the ground, where z=0 represents the horizon, and the XY plane is perpendicular to the Z axis. For instance, the world coordinate system may be implemented through adopting a world geodetic system (WGS). Alternatively, in other embodiments of the disclosure, an observer may define the position of the origin, the direction of the X axis, and the direction of the Y axis by himself/herself depending on what kind of reference system does the observer is expected to adopt to describe the position of the object. The disclosure is not limited thereto.

The camera coordinate system is a three-dimensional coordinate system formed by treating the center point of the camera lens as the origin. In the camera coordinate system, the directions of the three axes in the three-dimensional coordinate system is defined corresponding to the left-handed coordinate system or the right-handed coordinate system.

An image coordinate system is a coordinate system to which an image captured by the camera belongs. That is, the image coordinate system is practically a two-dimensional coordinate system. The image coordinate system is formed by the origin, the u axis, and the v axis. In an embodiment of the disclosure, the origin of the image coordinate system is located at the center of an image plane, the direction of the u axis is horizontal extending from left to right, and the direction of the v axis is vertical extending from bottom to top. Nevertheless, the disclosure is not limited thereto. The image coordinate system relates to the camera coordinate system. To be specific, when coordinates of the object are switched between image coordinates in the image coordinate system and world coordinates in the world coordinate system, such transformation is performed through the intermediary camera coordinate system.

FIG. 1 is a schematic view illustrating a system of an image positioning system according to an embodiment of the disclosure. With reference to FIG. 1, an image positioning system 100 includes a camera 110, a storage unit 120, and a processor 130.

The camera 110 is configured to obtain an image, and the camera 110 corresponds to extrinsic parameters and intrinsic parameters. The extrinsic parameters correspond to transformation between world coordinates and camera coordinates, for example but not limited to, rotation information and translation information. The intrinsic parameters correspond to transformation between the camera coordinates and image coordinates, for example but not limited to, parameters such as a camera focal length, image frame central point information, and camera lens distortion. The camera 110 may be implemented by adopting a camera of any model number or a camera from any brand, and the disclosure is not limited thereto.

The storage unit 120 is configured to store various types of program codes and data required by the image positioning system 100 during operation. In particular, coordinate transformation parameters are stored in the storage unit 120. The storage unit 120 may be, for example but not limited to, a static or a dynamic random access memory (RAM) in any form, a read-only memory (ROM), a flash memory, a hard disk drive (HDD), a solid state drive (SSD), any other similar device, or a combination of the foregoing devices. Further, the disclosure is not limited thereto.

The processor 130 is connected to the camera 110 and the storage unit 120 and is configured to receive an image from the camera 110, access a program code and data of the storage unit 120, and calculate and process quantitative data and so on, so as to complete various types of operations required by the image positioning system 100. The processor 130 is, for example, a central processing unit (CPU) or other programmable microprocessor for general or special use, a digital signal processor (DSP), a programmable controller, an application specific integrated circuit (ASIC), or any other similar device or a combination of the foregoing devices. The disclosure is not limited thereto.

In an embodiment of the disclosure, the camera 110 of the image positioning system 100 is externally connected to the processor 130. Alternatively, the storage unit 120 and the processor 130 are disposed in the camera 110 and are connected to various types of electrical devices of the camera 110. The disclosure is not limited thereto.

Figure 2:
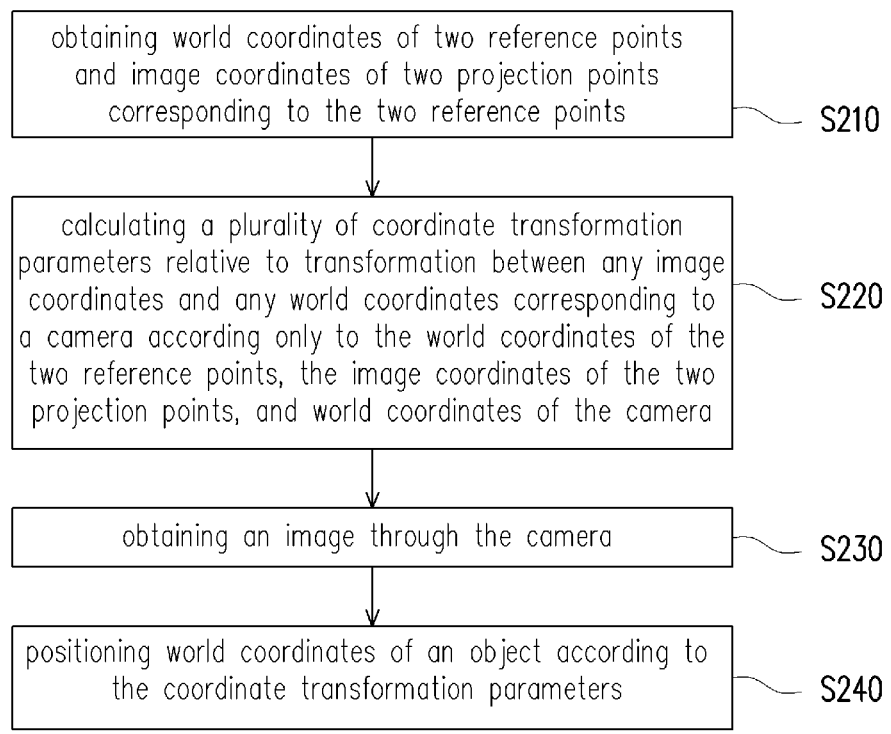
FIG. 2 is a schematic flow chart illustrating an image positioning method according to an embodiment of the disclosure.

FIG. 2 is a schematic flow chart illustrating an image positioning method according to an embodiment of the disclosure. The image positioning method of FIG. 2 is at least applicable to the image positioning system 100 of FIG. 1; nevertheless, the disclosure is not limited thereto. With reference to FIG. 1 and FIG. 2, execution of the image positioning method by the image positioning system 100 is described as follows through FIG. 1 and FIG. 2.

In step S210, the processor 130 obtains world coordinates of two reference points and image coordinates of two projection points corresponding to the two reference points. Further, in step S220, the processor 130 calculates a plurality of coordinate transformation parameters relative to transformation between any image coordinates and any world coordinates corresponding to the camera 110 according only to the world coordinates of the two reference points, the image coordinates of the two projection points, and world coordinates of the camera 110.

Specifically, the two reference points are any two points exist in the real world. The processor 130 receives the world coordinates of the two reference points through a configuration file or through user input. Alternatively, in another embodiment of the disclosure, an electronic apparatus having a position detection unit (for example but not limited to, a global positioning system (GPS) chip) disposed thereon is provided on the two reference points. The processor 130 communicates with the electronic apparatus connected on the two reference points to automatically obtain the world coordinates of the two reference points, but the disclosure is not limited thereto. Similarly, the processor 130 may also obtain the world coordinates of the camera 110 through the configuration file, through user input or through the position detection unit disposed on the camera 110. Nevertheless, the disclosure is not limited to the above embodiments. Specifically, the world coordinates of the camera 110 correspond to world coordinates of a lens of the camera 110, especially world coordinates representing a lens central point of the camera 110.

In addition, the processor 130 receives an image captured by the camera 110, and two corresponding projection points are also provided in this image. The processor 130 analyzes the image according to the two reference points, so as to obtain image coordinates corresponding to the two projection points on the image coordinate system. Alternatively, the processor 130 may also obtain the image coordinates of the two projection points on the image coordinate system through configuration file or user input. Accordingly, the processor 130 may obtain the plurality of coordinate transformation parameters relative to transformation between any image coordinates and any world coordinates corresponding to the camera 110 through the world coordinates of the camera, the world coordinates of the two reference points, and the image coordinates of the corresponding projection points on the image coordinate system. The coordinate transformation parameters include the extrinsic parameters corresponding to transformation between the world coordinates and the camera coordinates and intrinsic parameters corresponding to transformation between the camera coordinates and the image coordinates. The processor 130 records the coordinate transformation parameters in the storage unit 120. Details of obtaining the plurality of coordinate transformation parameters relative to transformation between any image coordinates and any world coordinates corresponding to the camera through the world coordinates of the camera, the world coordinates of the two reference points, and the image coordinates of the corresponding projection points on the image coordinate system are to be described in the following paragraphs.

In step S230, the camera 110 obtains an image (a second image). In this embodiment, an object image corresponding to an object is included in the image, and the object image corresponds to image coordinates in the image coordinate system. In step S240, the processor 130 positions world coordinates of the object according to the coordinate transformation parameters. Specifically, since the coordinate transformation parameters are stored in the storage unit 120, when obtaining the image captured by the camera 110, the processor 130 may directly transform the image coordinates of the object to the world coordinates of the object in the world coordinate system according to the coordinate transformation parameters.

Details of obtaining the plurality of coordinate transformation parameters relative to transformation between any image coordinates and any world coordinates corresponding to the camera through the world coordinates of the camera, the world coordinates of the two reference points, and the image coordinates of the corresponding projection points in the image coordinate system are described by adopting a first embodiment.

Note that in this embodiment, the world coordinate system and the camera coordinate system are the left-handed coordinate system. That is, the left thumb points in the positive direction of the Z axis, and the rest of the four fingers are curled in a direction of rotating from the positive direction of the X axis to the positive direction of the Y axis. Moreover, in the following embodiments, for the camera coordinate system determined by the processor 130, the lens central point of the camera acts as the origin (0,0,0) of the camera coordinate system. A direction looking straight ahead the camera lens acts as the positive direction of the x axis of the camera coordinate system. Further, according to the relative directions of the three axes corresponding to the left-handed coordinate system, the horizontal right direction relative to the direction looking straight ahead the camera 110 is further determined to be the positive direction of the y axis of the camera coordinate system, and the vertical up direction relative to the direction looking straight ahead the camera 110 is further determined to be the positive direction of the z axis of the camera coordinate system. Moreover, when a rotation angle of the camera 110 around the x axis is not zero, the horizontal and vertical directions of the real world reflected in the image frame captured by the camera are not identical to the directions of the u axis and the v axis of the image coordinate system.

Besides, when the coordinate transformation parameters relative to transformation between any image coordinates and any world coordinates corresponding to the camera are obtained, a first intermediate coordinate system, a second intermediate coordinate system, and a third intermediate coordinate system are applied to obtain the coordinate transformation parameters. Specifically, since the camera coordinate system and the world coordinate system both adopt the Cartesian coordinate system in the three-dimensional space, numerical dependency (e.g., angle dependency, distance dependency and the like) exist therebetween. The first intermediate coordinate system, the second intermediate coordinate system, and the third intermediate coordinate system are coordinate systems formed in the intermediate of transformation from the world coordinate system to the camera coordinate system. Further, corresponding to each of the coordinate systems, a first coordinate axis is the X axis of the coordinate system, a second coordinate axis is the Y axis of the coordinate system, and a third coordinate axis is the Z axis of the coordinate system. For instance, corresponding to the world coordinate system, the world first coordinate axis, the world second coordinate axis, and the world third coordinate axis respectively are the X axis, the Y axis, and the Z axis of the world coordinate system. Corresponding to the first intermediate coordinate system, the intermediate first coordinate axis, the intermediate second coordinate axis, and the intermediate third coordinate axis respectively are the X' axis, the Y' axis, and the Z' axis of the first intermediate coordinate system. Corresponding to the second intermediate coordinate system, the intermediate first coordinate axis, the intermediate second coordinate axis, and the intermediate third coordinate axis respectively are the X" axis, the Y" axis, and the Z" axis of the second intermediate coordinate system. Corresponding to the third intermediate coordinate system, the intermediate first coordinate axis, the intermediate second coordinate axis, and the intermediate third coordinate axis respectively are the X'" axis, the Y'" axis, and the Z'" axis of the third intermediate coordinate system. Corresponding to the camera coordinate system, the camera first coordinate axis, the camera second coordinate axis, and the camera third coordinate axis respectively are the x axis, the y axis, and the z axis of the camera coordinate system. Nevertheless, the disclosure is not limited thereto.

Figure 3:
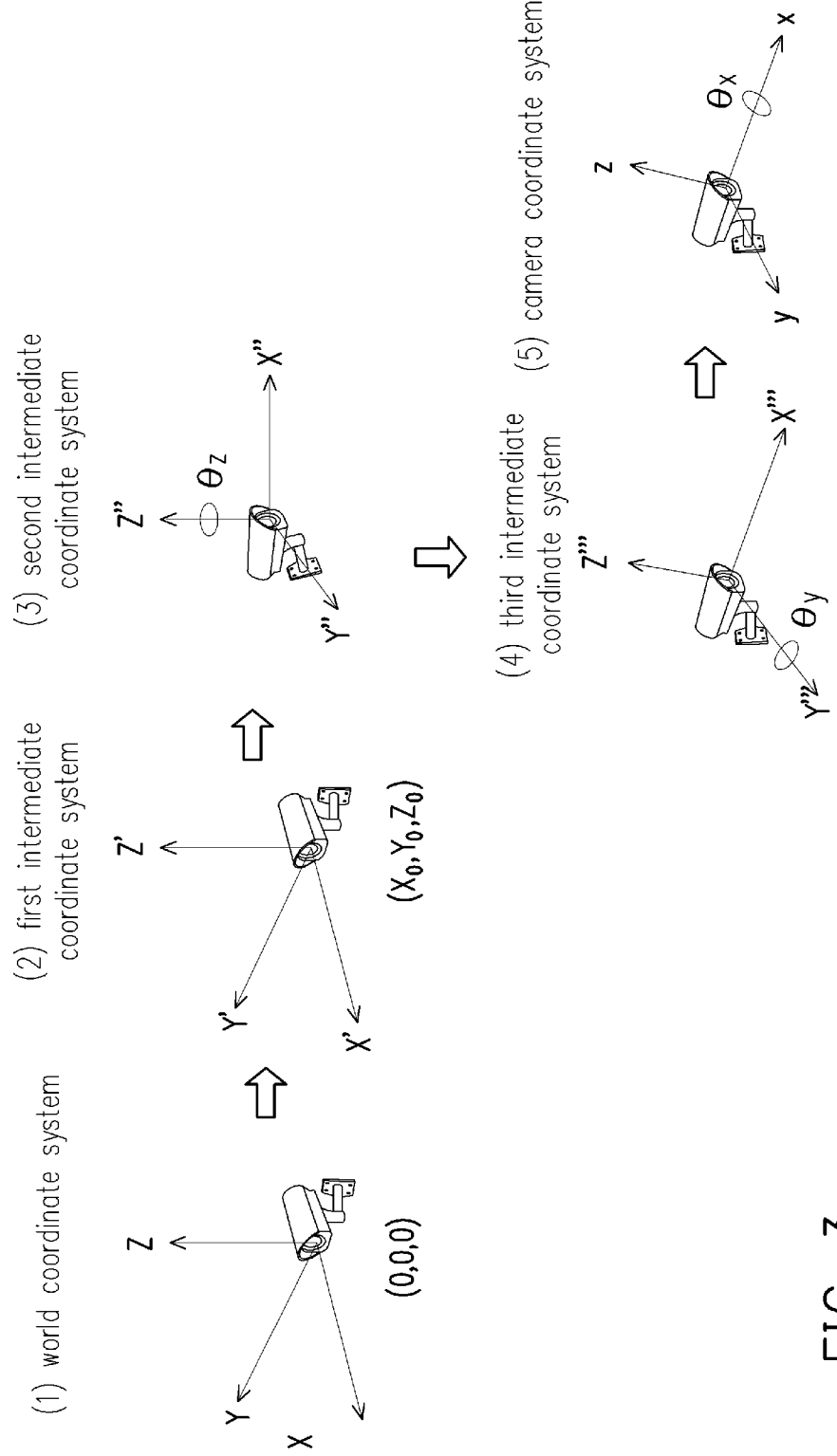
FIG. 3 and FIG. 4 are schematic diagrams illustrating transformation between a world coordinate system and a camera coordinate system according to an embodiment of the disclosure.
Figure 4:
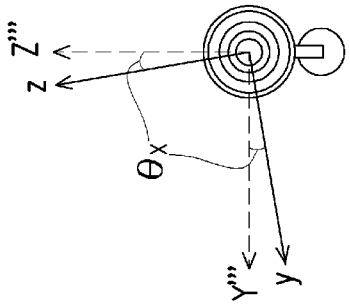
Figure 4:
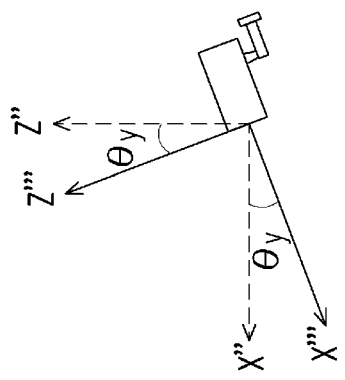
Figure 4:
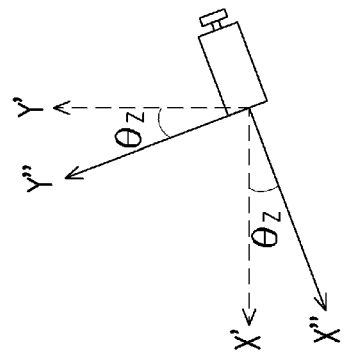

FIG. 3 and FIG. 4 are schematic diagrams illustrating transformation between a world coordinate system and a camera coordinate system according to an embodiment of the disclosure. With reference to FIG. 3, to be specific, in FIG. 3, (1) corresponds to the world coordinate system. At this time, the x axis, the y axis, and the z axis of the camera coordinate system respectively overlap the X axis, the Y axis, and the Z axis of the world coordinate system, therein, world coordinates of a lens center of the camera 110 are (0,0,0).

In FIG. 3, (2) corresponds to the first intermediate coordinate system. Different from the world coordinate system, the first intermediate coordinate system is entirely translated, so that the world coordinates of the lens center of the camera 110 is translated from (0,0,0) to $(X_0,Y_0,Z_0)$. At this time, the directions of the X axis, the Y axis, and the Z axis remain to be unchanged. But since the origin is translated, the X' axis, the Y' axis, and the Z' axis of the first intermediate coordinate system are formed. In this embodiment, $X_0$, $Y_0$, and $Z_0$ may be any real numbers but are not limited thereto.

In FIG. 3, (3) corresponds to the second intermediate coordinate system. Different from the first intermediate coordinate system, the second intermediate coordinate system may be rotated through an angle of $\theta_z$ around the Z' axis. Further, with reference to a top view illustrating a camera in (1) of FIG. 4, compared with the first intermediate coordinate system, the origin and the intermediate third coordinate axis of the second intermediate coordinate system remain to be unchanged. Therefore, the Z" axis is equivalent to the Z' axis, but both the X' axis and the Y' axis are rotated through the angle of $\theta_z$ in a same direction, so that the X" axis and the Y" axis in the second intermediate coordinate system are formed.

In FIG. 3, (4) corresponds to the third intermediate coordinate system. Different from the second intermediate coordinate system, the third intermediate coordinate system may be rotated through an angle of $\theta_y$ around the Y" axis. Further, with reference to a side view illustrating a camera in (2) of FIG. 4, compared with the second intermediate coordinate system, the origin and the intermediate second coordinate axis of the third intermediate coordinate system remain to be unchanged. Therefore, the Y''' axis is equivalent to the Y" axis, but both the Z" axis and the X" axis are rotated through an angle of $\theta_y$ in a same direction, so that the Z''' axis and the X''' axis in the third intermediate coordinate system are formed.

In FIG. 3, (5) corresponds to the camera coordinate system. Different from the third intermediate coordinate system, the camera coordinate system may be rotated through an angle of $\theta_x$ around the X''' axis. Further, with reference to a front view illustrating a camera in (3) of FIG. 4, compared with the third intermediate coordinate system, the origin and the first coordinate axis of the camera coordinate system remain to be unchanged. Therefore, the x axis is equivalent to the X''' axis, but both the directions of the Y''' axis and the Z''' axis are rotated through an angle of $\theta_x$ in a same direction, so that the y axis and the z axis in the camera coordinate system are formed. Through translation and rotation made to the origin, the X axis, the Y axis, and the Z axis, the position and direction of the camera are both transformed from the world coordinate system to the camera coordinate system.

In contrast, if the camera coordinate system is to be transformed back to the world coordinate system, the camera coordinate system is transformed to the third intermediate coordinate system, the second intermediate coordinate system, and the first intermediate coordinate system and then back to the world coordinate system.

Note that if the processor 130 knows that the world coordinates of the object in the world coordinate system are $(X_k,Y_k,Z_k)$, the processor 130 can transform the world coordinates of the object to the camera coordinates of $(x_k,y_k,z_k)$ in the camera coordinate system. Transformation from the world coordinates in the world coordinate system to the camera coordinates in the camera coordinate system by the processor 130 may be represented by formula (1):

$$\begin{bmatrix} x_k \\ y_k \\ z_k \end{bmatrix} = M_x M_y M_z \begin{bmatrix} X_k - X_0 \\ Y_k - Y_0 \\ Z_k - Z_0 \end{bmatrix} \qquad (1)$$

where $X_0$, $Y_0$, and $Z_0$ respectively correspond to the world coordinates $(X_0,Y_0,Z_0)$ of the camera lens in the world coordinate system. Matrixes $M_x$, $M_y$, and $M_z$ are respectively configured to represent the rotation of the first coordinate axis, the second coordinate axis, and the third coordinate axis, and an order of which the matrixes are multiplied corresponds to the process of transformation from the world coordinate system to the camera coordinate system. $M_x$, $M_y$, and $M_z$ may be represented by formula (2):

$$M_x = \begin{bmatrix} 1 & 0 & 0 \\ 0 & \cos\theta_x & \sin\theta_x \\ 0 & -\sin\theta_x & \cos\theta_x \end{bmatrix},$$

$$M_y = \begin{bmatrix} \cos\theta_y & 0 & -\sin\theta_y \\ 0 & 1 & 0 \\ \sin\theta_y & 0 & \cos\theta_y \end{bmatrix},$$

$$M_z = \begin{bmatrix} \cos\theta_Z & \sin\theta_Z & 0 \\ -\sin\theta_Z & \cos\theta_Z & 0 \\ 0 & 0 & 1 \end{bmatrix} \qquad (2)$$

In contrast, if the camera coordinates of the object in the camera coordinate system are $(x_k,y_k,z_k)$, the processor 130 may obtain the world coordinates of $(X_k,Y_k,Z_k)$ of the object in the world coordinate system. The process of obtaining the world coordinates of the object in the world coordinate system by the processor 130 may be represented by the following coordinate transformation formula (3):

$$\begin{bmatrix} X_k \\ Y_k \\ Z_k \end{bmatrix} = M_z^{-1} M_y^{-1} M_x^{-1} \begin{bmatrix} x_k \\ y_k \\ z_k \end{bmatrix} + \begin{bmatrix} X_0 \\ Y_0 \\ Z_0 \end{bmatrix} \qquad (3)$$

where matrixes $M_x^{-1}$, $M_y^{-1}$, and $M_z^{-1}$ are respectively configured to represent reverse rotation of the first coordinate axis, the second coordinate axis, and the third coordinate axis, and an order of which the matrixes are multiplied corresponds to the process of transformation from the camera coordinate system to the world coordinate system. $M_x^{-1}$, $M_y^{-1}$, and $M_z^{-1}$ may be represented by formula (4):

$$M_x^{-1} = \begin{bmatrix} 1 & 0 & 0 \\ 0 & \cos\theta_x & -\sin\theta_x \\ 0 & \sin\theta_x & \cos\theta_x \end{bmatrix},$$

$$M_y^{-1} = \begin{bmatrix} \cos\theta_y & 0 & \sin\theta_y \\ 0 & 1 & 0 \\ -\sin\theta_y & 0 & \cos\theta_y \end{bmatrix},$$

$$M_z^{-1} = \begin{bmatrix} \cos\theta_z & -\sin\theta_z & 0 \\ \sin\theta_z & \cos\theta_z & 0 \\ 0 & 0 & 1 \end{bmatrix}$$

(4)

Nevertheless, compared to the world coordinate system, the camera coordinate system may be changed as affected by extrinsic parameters such as position and angle of the camera 110. Moreover, corresponding to each of the camera coordinates an object located in the camera coordinate system, the image coordinates of the object in the image coordinate system may be related to intrinsic parameters of the camera 110 such as the focal length. Therefore, when the coordinate transformation parameters are obtained and stored in the storage unit 120, calculation of transformation between the world coordinates and the image coordinates of the object may be accelerated, so that the object in the image is further positioned.

Figure 5:
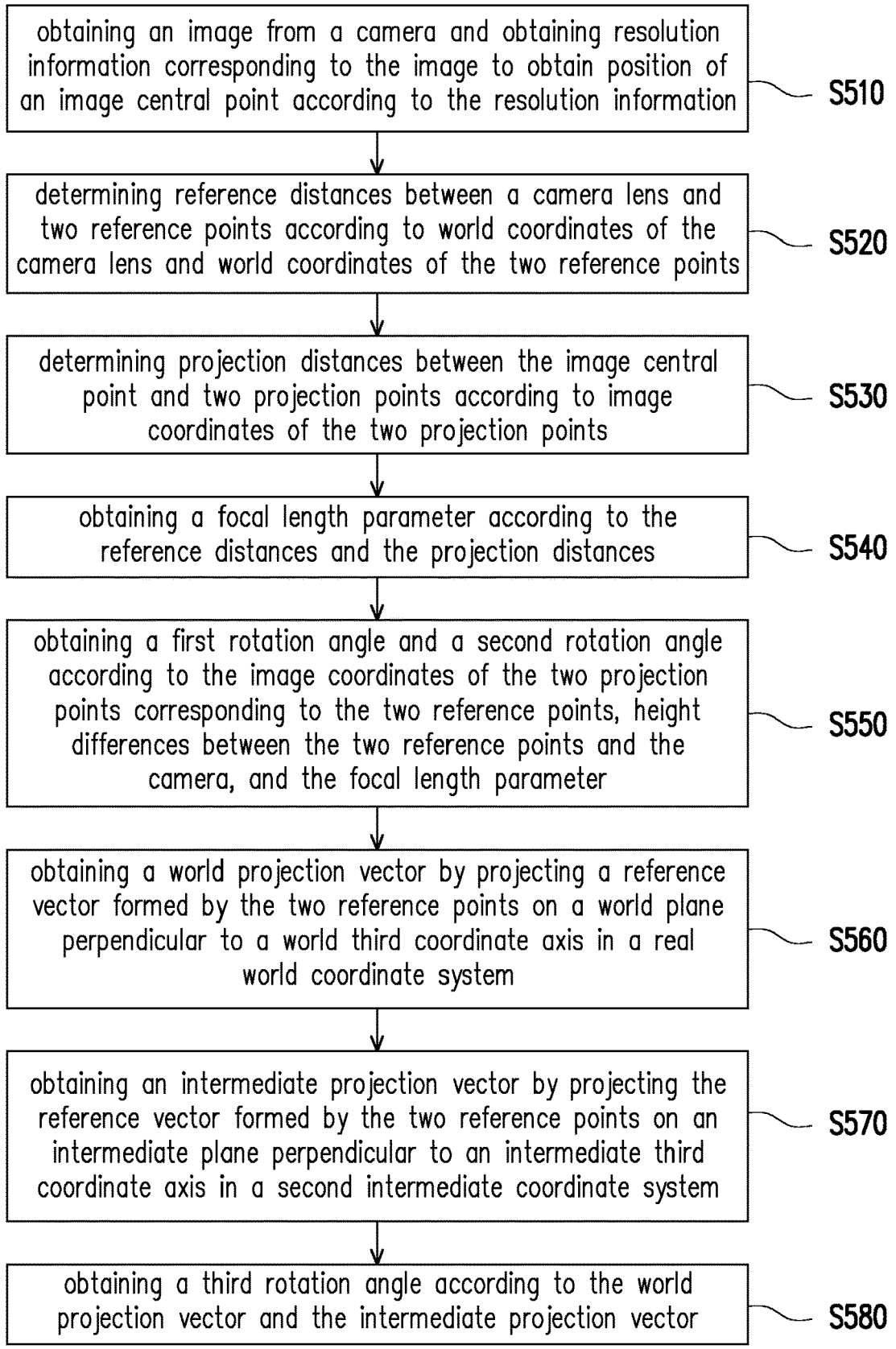
FIG. 5 is a detailed flow chart illustrating part of the image positioning method according to an embodiment of the disclosure.
Figure 6:
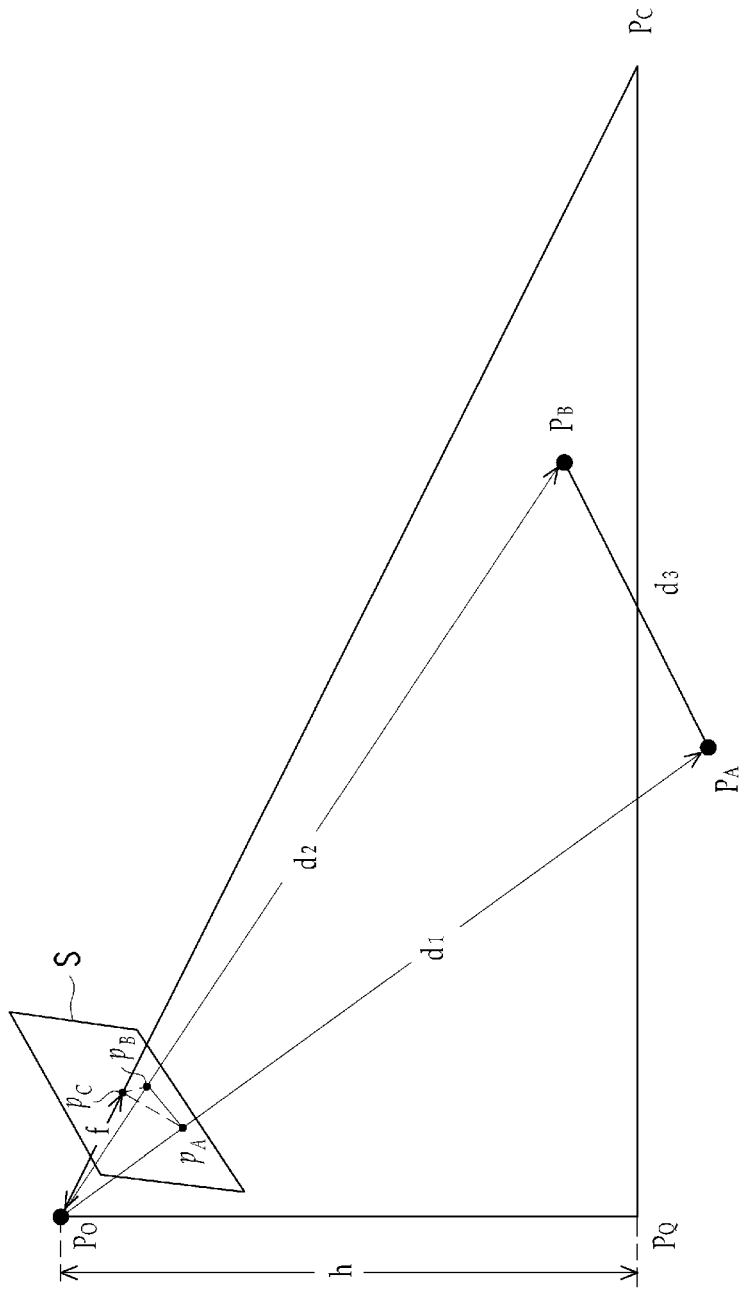
FIG. 6 is a schematic geometric diagram illustrating two reference points corresponding to the embodiment of FIG. 5.
Figure 7:
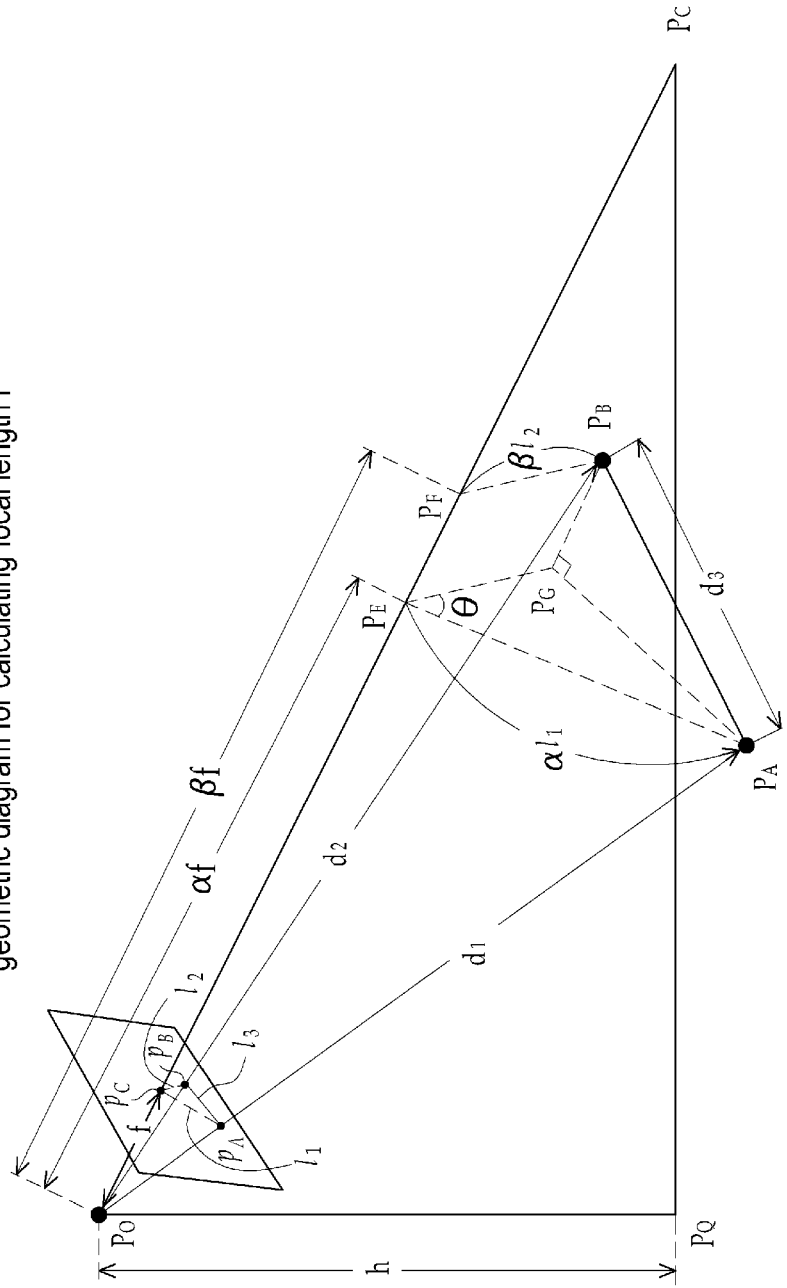
FIG. 7 is a schematic geometric diagram illustrating obtaining a focal length parameter corresponding to the embodiment of FIG. 5.

FIG. 5 is a detailed flow chart illustrating part of the image positioning method according to an embodiment of the disclosure. FIG. 6 is a schematic geometric diagram illustrating two reference points corresponding to the embodiment of FIG. 5. FIG. 7 is a schematic geometric diagram illustrating obtaining a focal length parameter corresponding to the embodiment of FIG. 5. The process of obtaining the plurality of coordinate transformation parameters relative to transformation between any image coordinates and any world coordinates corresponding to the camera through the world coordinates of the camera, the world coordinates of the two reference points, and the image coordinates of the corresponding projection points on the image coordinate system are described through FIG. 5 to FIG. 7.

With reference to FIG. 5 to FIG. 7, in step S510 of FIG. 5, the processor 130 obtains an output image (a first image) from the camera 110 and obtains resolution information corresponding to the output image to obtain position of an image central point $p_C$ according to the resolution information.

Specifically, the resolution information corresponds to the width and height resolution of the output image. Therefore, after obtaining the width and height resolution of the image, the processor 130 transfers the location of image into coordinates according to the resolution information and analyzes the image. In this way, the processor 130 may further determine the image coordinates of the two projection points. For instance, in the image with the resolution being 1920×1080, the upper left corner being the origin, the horizontal axis extending from left to right, and the vertical axis extending from top to bottom, the position of the image central point is (960,540). If position of a projection point $p_A$ are $(u'_A, v'_A)$ and position of a projection point $p_B$ are $(u'_B, v'_B)$, in this embodiment, the processor 130 further sets the image coordinates of the image central point to be (0,0), the horizontal axis to be extending from left to right, and the vertical axis to be extending from bottom to top. That is, the coordinates of the upper left corner of the image are changed from (0, 0) to (−960, 540), the image coordinates of the projection point $p_A$ are $(u_A, v_A) = (u'_A - 960, -v'_A + 540)$, and the image coordinates of the projection point $p_B$ are $(u_B, v_B) = (u'_B - 960, -v'_B + 540)$. Nevertheless, the disclosure is not limited thereto.

Specifically, with reference to FIG. 5 to FIG. 6 together, in FIG. 6, the two reference points respectively are the first reference point $P_A$ and the second reference point $P_B$ in the world coordinate system. Further, the camera 110 captures and outputs an image. The output image corresponds to the image coordinate system and has the first projection point $p_A$ and the second projection point $p_B$ corresponding to the two reference points. The lens central point of the camera is marked as $P_O$, and the x axis of the camera coordinate system passes through the camera lens $P_O$ and forms a central intersection point $P_C$ with the ground. A reference distance from the lens central point $P_O$ of the camera to the first reference point $P_A$ is $d_1$, a reference distance from the lens central point $P_O$ of the camera to the second reference point $P_B$ is $d_2$, and a reference distance from the first reference point $P_A$ to the second reference point $P_B$ is $d_3$. The lens central point $P_O$ of the camera vertically projects to the ground to form a vertical intersection point $P_Q$, and a height from the lens central point $P_O$ of the camera to the vertical intersection point $P_Q$ is h.

Besides, a projection plane S perpendicular to the X axis is provided in FIG. 6. That is, the projection plane S is parallel to an imaging plane of the camera 110 and corresponds to the output image of the camera 110. In this embodiment, the x axis extends to a direction looking straight ahead the camera lens, and the x axis of the camera coordinate system disappears in the central point of the image coordinate system to form a two-dimensional space. In this way, a projection position of the lens central point $P_O$ of the camera on the image coordinate system may be treated as the image central point $p_C$. A distance between the lens central point $P_O$ of the camera and the projection point $p_C$ is a focal length f between the lens central point $P_O$ of the camera and the projection plane S. In addition, the projection plane S respectively intersects with straight lines formed between the lens central point $P_O$ of the camera and the first reference point $\overline{P_O P_A}$ and formed between the lens central point $P_O$ of the camera and the second reference point $\overline{P_O P_B}$, so that the first projection point $p_A$ and the second projection point $p_B$ corresponding to the first reference point $P_A$ and the second reference point $P_B$ are formed. Moreover, with reference to FIG. 7, a projection distance between the image central point $p_C$ and the first projection point $p_A$ is $l_1$, a projection distance between the image central point $p_C$ and the second projection point $p_B$ is $l_2$, and a projection distance between the first projection point $p_A$ and the second projection point $p_B$ is $l_3$.

In step S520, the processor 130 determines the reference distances between the camera lens and the two reference points according to the world coordinates of the camera lens and the world coordinates of the two reference points.

The processor 130 obtains the world coordinates of the two reference points $P_A$ and $P_B$ and the world coordinates of the lens central point $P_O$ of the camera. Therefore, the processor 130 calculates the reference distance $d_1$ between the lens central point $P_O$ of the camera and the first reference point $P_A$, the reference distance $d_2$ between the lens central point $P_O$ of the camera and the second reference point $P_B$, and the reference distance $d_3$ between the first reference point $P_A$ and the second reference point $P_B$ according to the world coordinates of the two reference points $P_A$ and $P_B$ and the world coordinates of the camera. In other embodiments of the disclosure, the processor 130 may also directly receive the reference distance $d_1$, the reference distance $d_2$, and the reference distance $d_3$ inputted by the user, and the disclosure is not limited thereto. Note that the reference distances $d_1$, $d_2$, and $d_3$ may be presented through distance units (e.g., centimeters and millimeters) and may also be presented by adopting a unit of image pixels, and the disclosure is not limited thereto. The processor 130 automatically converts all parameters and variables into the same unit. For instance, in an embodiment, 1 centimeter equals to 37.795275591 pixels. Accordingly, the processor 130 may thereby convert all parameters and variables between centimeters and pixels.

In step S530, the processor 130 determines the projection distances between the image central point $p_C$ and the two projection points $p_A$ and $p_B$ according to the image coordinates of the two projection points $p_A$ and $p_B$. The processor 130 obtains the image coordinates of the two projection points $P_A$ and $p_B$ and the image central point $p_C$. In this way, in an embodiment, the image coordinates of the image central point $p_C$ are the origin (0, 0). Moreover, the processor 130 further determines the projection distance $l_1$ between the image central point $p_C$ and the first projection point $p_A$, the projection distance $l_2$ between the image central point $p_C$ and the second projection point $p_B$, and the projection distance $l_3$ between the first projection point $p_A$ and the second projection point $p_B$ according to the image coordinates of the two projection points $p_A$ and $p_B$. Herein, the projection distances $l_1$, $l_2$, and $l_3$ may be presented through distance units and may also be presented by adopting a unit of image pixel, and the disclosure is not limited thereto.

In step S540, the processor 130 obtains a focal length parameter f according to the reference distances $d_1$, $d_2$, and $d_3$ and the projection distances $l_1$, $l_2$, and $l_3$. With reference to FIG. 7 together, first, vertical reference points $P_E$ and $P_F$ are determined by vertically projecting $P_A$ and $P_B$ to the x axis of the camera coordinate system respectively. In this way, a triangle formed by the lens central point $P_O$ of the camera, the first reference point $P_A$, and a first vertical reference point $P_E$ and a triangle formed by the lens central point $P_O$ of the camera, the second reference point $P_B$, and a second vertical reference point $P_F$ are thereby determined.

Moreover, the lens central point $P_O$ of the camera, the image central point $p_C$, the first vertical reference point $P_E$, and the second vertical reference point $P_F$ are all located on the x axis. As such, a distance between the lens central point $P_O$ of the camera and the image central point $p_C$ is a multiple of a distance between the lens central point $P_O$ of the camera and the first vertical reference point $P_E$ and is a multiple of a distance between the lens central point $P_O$ of the camera and the second vertical reference point $P_F$. Further, the distance between the lens central point $P_O$ of the camera and the image central point $p_C$ is equivalent to the focal length f. In this way, the processor 130 determines the distance between the lens central point $P_O$ of the camera and the first vertical reference point $P_E$ is equivalent to $\alpha f$ and the distance between the lens central point $P_O$ of the camera and the second vertical reference point $P_F$ is equivalent to $\beta f$ according to distance multiples $\alpha$ and $\beta$.

Besides, with reference to FIG. 7, since an included angle $\angle P_A P_O P_E$ equals to an included angle $\angle p_A P_O p_C$ and an included angle $\angle P_O P_E P_A$ equals to an included angle $\angle P_O p_C p_A$, a triangle $\Delta P_O P_A P_E$ is similar to a triangle $\Delta P_O p_A p_C$. As a length of a line segment $\overline{P_O P_E}$ is a multiple of a length of a line segment $\overline{P_O p_C}$, a length of a line segment $\overline{P_E P_A}$ is obtained and is $\alpha l_1$. Similarly, a triangle $\Delta P_O P_B P_F$ is similar to a triangle $\Delta P_O p_B p_C$. As a length of a line segment $\overline{P_O P_F}$ is a multiple of a length of a line segment $\overline{P_O p_C}$, a length of a line segment $\overline{P_F P_B}$ is obtained and is $\beta l_2$.

Accordingly, the processor 130 determines correlations between the reference distances $d_1$, $d_2$, and $d_3$ and the projection distances $l_1$, $l_2$, and $l_3$. For instance, the correlations determined by the processor 130 may be represented by the following formulas (5) and (6). In the following formulas (5) and (6), the triangle $\Delta P_O P_A P_E$ formed by the lens central point $P_O$ of the camera, the first reference point $P_A$, and the first vertical reference point $P_E$ and the triangle $\Delta P_O P_B P_F$ formed by the lens central point $P_O$ of the camera, the second reference point $P_B$ and the second vertical reference point $P_F$ are expressed through the Pythagorean theorem:

$$(\alpha f)^2 + (\alpha l_1)^2 = d_1^2 \quad (5)$$

$$(\beta f)^2 + (\beta l_2)^2 = d_2^2 \quad (6)$$

In addition, the processor 130 further determines a central angle $\theta$ constituted by the image central point $p_C$ and the first projection point $p_A$ and the second projection point $p_B$ as well as correlations between the reference distances $d_1$, $d_2$, and $d_3$ and the projection distances $l_1$, $l_2$, and $l_3$.

To be specific, with reference to FIG. 7 for further description, if a line segment $\overline{P_F P_B}$ is moved in parallel to the x axis so that the second vertical reference point $P_F$ is moved to the position of the first vertical reference point $P_E$, the second reference point $P_B$ is moved to the position of an auxiliary point $P_G$, and a line segment $\overline{P_E P_G}$ is formed. Further, a quadrilateral formed by the first vertical reference point $P_E$, the second vertical reference point $P_F$, the second reference point $P_B$, and the auxiliary point $P_G$ is a parallelogram. As such, the line segment $\overline{P_E P_G}$ is parallel to the line segment $\overline{P_F P_B}$, and lengths of the two line segments are both $\beta l_2$ while the line segment $\overline{P_G P_B}$ is parallel to the line segment $\overline{P_E P_F}$, and lengths of the two line segments are both $|\beta - \alpha| \times f$.

Moreover, since the line segment $\overline{P_F P_B}$ is perpendicular to the line segment $\overline{P_O P_C}$, the line segment $\overline{P_E P_G}$ is also perpendicular to the line segment $\overline{P_O P_C}$. Since the line segment $\overline{P_E P_A}$ is perpendicular to the line segment $\overline{P_O P_C}$ as well, the line segment $\overline{P_O P_C}$ is perpendicular to a plane $P_A P_E P_G$. Besides, the line segment $\overline{P_G P_B}$ is parallel to the line segment $\overline{P_O P_C}$, the line segment $\overline{P_G P_B}$ is thus perpendicular to the plane $P_A P_E P_G$. Therefore, the line segment $\overline{P_G P_B}$ is perpendicular to the line segment $\overline{P_A P_G}$ on the plane $P_A P_E P_G$. That is, the triangle formed by the first reference point $P_A$, the auxiliary point $P_G$, and the second reference point $P_B$ is a right triangle. Accordingly, through the Pythagorean theorem, the line segment $\overline{P_A P_G}$ may be expressed as formula (7):

$$\overline{P_A P_G}^2 = \overline{P_A P_B}^2 - \overline{P_G P_B}^2 = d_3^2 - (\alpha - \beta)^2 f^2 \quad (7)$$

Further, since $\overline{P_F P_B}$ is parallel to $\overline{p_C p_B}$, $\overline{P_E P_G}$ is parallel to $\overline{p_C p_B}$, and since $\overline{P_E P_A}$ is parallel to $\overline{p_C p_A}$, the included angle $\angle P_A P_E P_G$ is equal to the included angle $\angle p_A p_C p_B$ (e.g., the central angle $\theta$). Hence, through the central angle $\theta$ formed by the first reference point $P_A$, the first vertical reference point $P_E$, and the auxiliary point $P_G$, the correlations between the reference distances and the projection distances determined by the processor 130 may be expressed as formula (8) according to the law of cosines:

$$\cos\theta = \frac{(\alpha l_1)^2 + (\beta l_2)^2 - d_3^2 + (\alpha - \beta)^2 f^2}{2\alpha\beta l_1 l_2} \quad (8)$$

where, based on the law of cosines, a cosine value cos θ of the central angle θ formed by the first projection point $p_A$, the image central point $p_C$, and the second projection point $p_B$ is known, such as:

$$\cos\theta = \frac{l_1^2 + l_2^2 - l_3^2}{2l_1 l_2}.$$

Accordingly, the processor 130 obtains the value of the focal length parameter f according to the correlations between the reference distances $d_1$, $d_2$, and $d_3$ and the projection distances $l_1$, $l_2$, and $l_3$ and the central angle θ constituted by the first projection point $p_A$, the image central point $p_C$, and the second projection point $p_B$. In the description of the geometric shapes and the relationships among numerical values of FIG. 7, the distance multiples α and β and the value of the focal length f are obtained through calculations of formulas (5), (6), and (8). Calculations of formulas (5), (6), and (8) to obtain α and β and the value of the focal length f can be easily understood by people having ordinary skill in the art, and the disclosure is not limited thereto. In an embodiment, α and β and the value of the focal length f can be obtained through formulas (9), (10), and (11):

$$\alpha^2 = \frac{-A \pm \sqrt{A^2 - 4B}}{2} \quad (9)$$

$$\beta^2 = \frac{d_2^2 \alpha^2}{(b-a)\alpha^2 + d_1^2} \quad (10)$$

$$f^2 = \frac{d_1^2 + d_2^2 - d_3^2 - 2l_1 l_2 \alpha\beta\cos\theta}{2\alpha\beta} \quad (11)$$

where, parameters A, B, a, b, and c are expressed as formulas (12):

$$A = \frac{(a-b)c^2 - 2ad_1^2 d_2^2}{a^2 d_2^2},$$

$$B = \frac{d_1^2(d_1^2 d_2^2 - c^2)}{a^2 d_2^2},$$

$$a = l_1^2 - l_1 l_2 \cos\theta,$$

$$b = l_2^2 - l_1 l_2 \cos\theta,$$

$$c = \frac{d_1^2 + d_2^2 - d_3^2}{2}.$$

(12)

Note that if formulas (5), (6), and (8) are used for calculation, each of $\alpha^2$ and $\beta^2$ may produce two positive solutions, a square $f^2$ of the focal length parameter can be obtained through the positive solutions of the corresponding distance multiples α and β, and the focal length parameter f is thereby obtained. Nevertheless, only one of the two sets of positive solutions of $\alpha^2$ and $\beta^2$ and $f^2$ satisfies formulas (5) and (6), so that the unique solutions of the distance multiples α and β and the focal length parameter f are obtained.

In step S550, the processor 130 obtains a first rotation angle $\theta_x$ and a second rotation angle $\theta_y$ according to the image coordinates of the two projection points $p_A$ and $p_B$ corresponding to the two reference points $P_A$ and $P_B$, height difference between the reference points $P_A$ and the camera, height difference between the reference points $P_B$ and the camera, and the focal length parameter f. To be specific, in this embodiment, when the first intermediate coordinate system is transformed to the second intermediate coordinate system, the camera 110 rotates about the Z' axis of the first intermediate coordinate system. Further, since the direction of the Z' axis does not change, the coordinate values of the intermediate third coordinate axis of the reference points $P_A$ and $P_B$ respectively in the second intermediate coordinate system and in the first intermediate coordinate system are equal (unchanged). Based on such feature, the processor 130 determines the first rotation angle $\theta_x$ and the second rotation angle $\theta_y$ corresponding to the first coordinate axis and the second coordinate axis.

Specifically, the processor 130 determines the coordinate values of the intermediate third coordinate axis of the two reference points $P_A$ and $P_B$ in the second intermediate coordinate system. Moreover, the processor 130 ensures that the coordinate values of the intermediate third coordinate axis of the two reference points $P_A$ and $P_B$ in the second intermediate coordinate system are identical regardless transformation from the world coordinate system to the second intermediate coordinate system or from the camera coordinate system to the second intermediate coordinate system. From the perspective of geometric angles, when the camera coordinate system is transformed to the second intermediate coordinate system, the camera coordinate system first is rotated around the camera first coordinate axis through an angle $-\theta_x$ to become the third intermediate coordinate system and then is rotated around the second coordinate axis through an angle $-\theta_y$ to become the second intermediate coordinate system. For instance, if coordinates of an object in the camera coordinate system are $(x_k, y_k, z_k)$, the coordinates of the object in the second intermediate coordinate system may be expressed as formula (13):

$$\begin{bmatrix} X_k'' \\ Y_k'' \\ Z_k'' \end{bmatrix} = \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \begin{bmatrix} x_k \\ y_k \\ z_k \end{bmatrix} \quad (13)$$

$$= \begin{bmatrix} \cos\theta_y & \sin\theta_x \sin\theta_y & \cos\theta_x \sin\theta_y \\ 0 & \cos\theta_x & -\sin\theta_x \\ -\sin\theta_y & \sin\theta_x \cos\theta_y & \cos\theta_x \cos\theta_y \end{bmatrix} \begin{bmatrix} x_k \\ y_k \\ z_k \end{bmatrix}$$

In this embodiment, the image coordinates of the first projection point $p_A$ and the second projection point $p_B$ on the projection plane respectively are $(u_A, v_A)$ and $(u_B, v_B)$, so when the two projection points $p_A$ and $p_B$ are transformed to the camera coordinate system, the camera coordinates of the two reference points $P_A$ and $P_B$ respectively are $(\alpha f, \alpha u_A, \alpha v_A)$ and $(\beta f, \beta u_B, \beta v_B)$. Therefore, according to formula (13), $(x_k, y_k, z_k)$ of formula (13) is substituted for $(\alpha f, \alpha u_A, \alpha v_A)$ and $(\beta f, \beta u_B, \beta v_B)$, and the coordinate values of the intermediate third coordinate axis of the two reference points $P_A$ and $P_B$ in the second intermediate coordinate system may respectively be expressed as $(-\alpha f \sin\theta_y + \alpha u_A \sin\theta_x \cos\theta_y + \alpha v_A \cos\theta_x \cos\theta_y)$ and $(-\beta f \sin\theta_y + \beta u_B \sin\theta_x \cos\theta_y + \beta v_B \cos\theta_x \cos\theta_y)$. In addition, it is assumed that the two reference points $P_A$ and $P_B$ of this embodiment are located on the ground, and thereby, the coordinate values of the intermediate third coordinate axis of the two reference points $P_A$ and $P_B$ in the first intermediate coordinate system are both $-h$. Herein, h is a height of the camera lens away from the ground, and that is, h equals the coordinate value $Z_0$ of the Z axis of the camera lens in the world coordinate system. Since the coordinate values of the intermediate third coordinate axis of the two reference points $P_A$ and $P_B$ in the second intermediate coordinate system and in the first intermediate coordinate system are equal, formula (14) and formula (15) may be performed:

$$-\alpha f \sin \theta_y + \alpha u_A \sin \theta_x \cos \theta_y + \alpha v_A \cos \theta_x \cos \theta_y = -h \quad (14)$$

$$-\beta f \sin \theta_y + \beta u_B \sin \theta_x \cos \theta_y + \beta v_B \cos \theta_x \cos \theta_y = -h \quad (15)$$

Herein, α, β, and f are known. Calculations of formulas (14) and (15) to obtain $\theta_x$ and $\theta_y$ can be easily understood by people having ordinary skill in the art, and the disclosure is not limited thereto. In an embodiment, the values of $\cos^2\theta_x$ and $\cos^2\theta_y$ may be obtained through formulas (16) and (17):

$$\cos^2\theta_y = \frac{-\left(2PQ + \frac{q}{p}R^2\right) \pm R\sqrt{R^2\left(\frac{q}{p}\right)^2 + 4PQ\frac{q}{p} - 4P^2\frac{r}{p}}}{2P^2} \quad (16)$$

$$\cos^2\theta_x = -\frac{1}{p}\left(q + \frac{r}{\cos^2\theta_y}\right) \quad (17)$$

where, the parameters P, Q, R, p, q, and r are respectively expressed as formula (18):

$$P = \alpha^2\beta^2\left\{\left(1 + \frac{q}{p}\right)(u_B - u_A)^2 + \frac{q}{p}(v_B - v_A)^2\right\}, \quad (18)$$

$$Q = \frac{r}{p}\alpha^2\beta^2\{(u_B - u_A)^2 + (v_B - v_A)^2\} - h^2(\beta - \alpha)^2,$$

$$R = 2h\alpha\beta(\beta - \alpha)(v_B - v_A),$$

$$p = \alpha^2\beta^2(u_B v_A - u_A v_B)$$

$$\{(u_B - u_A)(\beta u_B - \alpha u_A) + (v_B - v_A)(\beta v_B - \alpha v_A)\},$$

$$q = \alpha^2\beta^2(u_B - u_A)$$

$$\{f^2(\beta - \alpha)(v_B - v_A) - (\beta u_B - \alpha u_A)(u_B v_A - u_A v_B)\},$$

$$r = (\beta - \alpha)\{h^2(\beta u_B - \alpha u_A)(\beta v_B - \alpha v_A) - f^2\alpha^2\beta^2(u_B - u_A)(v_B - v_A)\}.$$

The processor 130 adopts the foregoing principles when obtaining the first rotation angle $\theta_x$ and the second rotation angle $\theta_y$ according to the two projection points $p_A$ and $p_B$ corresponding to the two reference points $P_A$ and $P_B$. As such, correlations between the first rotation angle $\theta_x$ and the second rotation angle $\theta_y$ and the two projection points $p_A$ and $p_B$ of the two reference points $P_A$ and $P_B$ may be expressed as formulas (14) and (15).

After calculation is performed by using formulas (14) and (15), $\cos^2\theta_x$, $\cos^2\theta_y$, $\sin^2\theta_x$, and $\sin^2\theta_y$ are obtained by selecting $0 \leq \cos^2\theta_x \leq 1$ and $0 \leq \cos^2\theta_y \leq 1$. Substitution into formulas (14) and (15) for the corresponding $\cos\theta_x$, $\cos\theta_y$, $\sin\theta_x$, and $\sin\theta_y$ is performed, and the only set of $\cos\theta_x$, $\cos\theta_y$, $\sin\theta_x$, and $\sin\theta_y$ is selected to satisfy formulas (14) and (15), and the unique solutions of $\theta_x$ and $\theta_y$ are thereby obtained.

Note that if the two reference points $P_A$ and $P_B$ are not located on the ground, the coordinate values of the intermediate third coordinate axis of the reference points $P_A$ and $P_B$ in the second intermediate coordinate system are respectively equal to $-(h-Z_A)$ and $-(h-Z_B)$. $Z_A$ and $Z_B$ respectively represent the coordinate values of the Z axis of the two reference points $P_A$ and $P_B$ in the world coordinate system. Therefore, the coordinate values of the intermediate third coordinate axis of the two reference points $p_A$ and $p_B$ in the second intermediate coordinate system may respectively be transformed into formulas (19) and (20):

$$\alpha f \sin \theta_y + \alpha u_A \sin \theta_x \cos \theta_y + \alpha v_A \cos \theta_x \cos \theta_y = -(h - Z_A) \quad (19)$$

$$\beta f \sin \theta_y + \beta u_B \sin \theta_x \cos \theta_y + \beta v_B \cos \theta_x \cos \theta_y = -(h - Z_B) \quad (19)$$

As such, correlations between the first rotation angle $\theta_x$ and the second rotation angle $\theta_y$ and the two projection points $P_A$ and $p_B$ of the two reference points $P_A$ and $P_B$ obtained by the processor 130 are adjusted to formulas (21) and (22):

$$\cos^2\theta_y = \frac{-\left(2PQ + \frac{q}{p}R^2\right) \pm R\sqrt{R^2\left(\frac{q}{p}\right)^2 + 4PQ\frac{q}{p} - 4P^2\frac{r}{p}}}{2P^2} \quad (21)$$

$$\cos^2\theta_x = -\frac{1}{p}\left(q + \frac{r}{\cos^2\theta_y}\right) \quad (22)$$

where, if $h^*_A = h - Z_A$ and $h^*_B = h - Z_B$, the parameters P, Q, R, p, q, and r may be respectively expressed as formula (23):

$$P = \alpha^2\beta^2\left\{\left(1 + \frac{q}{p}\right)(u_B - u_A)^2 + \frac{q}{p}(v_B - v_A)^2\right\}, \quad (23)$$

$$Q = \frac{r}{p}\alpha^2\beta^2\{(u_B - u_A)^2 + (v_B - v_A)^2\} - (\beta h^*_A - \alpha h^*_B)^2,$$

$$R = 2\alpha\beta(\beta h^*_A - \alpha h^*_B)(v_B - v_A),$$

$$p = \alpha^2\beta^2(u_B v_A - u_A v_B)$$

$$\{(u_B - u_A)(\beta u_B h^*_A - \alpha u_A h^*_B) + (v_B - v_A)(\beta v_B h^*_A - \alpha v_A h^*_B)\},$$

$$q = \alpha^2\beta^2(u_B - u_A)$$

$$\{f^2(\beta h^*_A - \alpha h^*_B)(v_B - v_A) - (\beta u_B h^*_A - \alpha u_A h^*_B)(u_B v_A - u_A v_B)\},$$

$$r = (\beta h^*_A - \alpha h^*_B)$$

$$\{(\beta u_B h^*_A - \alpha u_A h^*_B)(\beta v_B h^*_A - \alpha v_A h^*_B) - f^2\alpha^2\beta^2(u_B - u_A)(v_B - v_A)\}.$$

In step S560, the processors 130 obtains a world projection vector $\overline{P_{A^*}P_{B^*}}$ by projecting a reference vector $\overline{P_A P_B}$ formed by the two reference points $P_A$ and $P_B$ on a world plane (e.g., the XY plane) perpendicular to the world third coordinate axis in the world coordinate system.

In this embodiment, the world projection vector $\overline{P_{A^*}P_{B^*}}$ formed by projecting the reference vector $\overline{P_A P_B}$ on the XY plane in the world coordinate system is expressed as formula (24):

$$\overline{P_{A^*}P_{B^*}} = (X_B - X_A, Y_B - Y_A) \quad (24)$$

In step S570 the processor 130 obtains an intermediate projection vector $\overline{P''_{A^*}P''_{B^*}}$ by projecting the reference vector $\overline{P_A P_B}$ formed by the two reference points $P_A$ and $P_B$ on an intermediate plane (e.g., the X"Y" plane) perpendicular to the intermediate third coordinate axis in the second intermediate coordinate system.

In this embodiments, the coordinates of the two reference points $P_A$ and $P_B$ in the camera coordinate system respectively are $(\alpha f, \alpha u_A, \alpha v_A)$ and $(\beta f, \beta u_B, \beta v_B)$, and thereby, according to formula (13), the intermediate projection vector $\overline{P''_{A^*}P''_{B^*}}$ formed by projecting the reference vector $\overline{P_A P_B}$ on the X"Y" plane is expressed as formula (25):

$$\overline{P''_{A^*}P''_{B^*}} = (X''_B - X''_A, Y''_B - Y''_A) \quad (25)$$

where, $X''_A$, $X''_B$, $Y''_A$, and $Y''_B$ are respectively expressed as formulas (26)

$X_A''=\alpha(f \cos \theta_y + u_A \sin \theta_x \sin \theta_y + v_A \cos \theta_x \sin \theta_y)$, $X_B''=\beta(f \cos \theta_y + u_B \sin \theta_x \sin \theta_y + v_B \cos \theta_x \sin \theta_y)$, $Y_A''=\alpha(u_A \cos \theta_x - v_A \sin \theta_x)$, $Y_B''=\beta(u_B \cos \theta_x - v_B \sin \theta_x)$. (26)

In step S580, the processor 130 obtains a third rotation angle $\theta_z$ according to the world projection vector $\overrightarrow{P_A \cdot P_{B^*}}$ and the intermediate projection vector $\overrightarrow{P_{A^*}'' P_{B^*}''}$.

The processor 130 may obtain the third rotation angle $\theta_z$ according to the world projection vector $\overrightarrow{P_A \cdot P_{B^*}}$ and the intermediate projection vector $\overrightarrow{P_{A^*}'' P_{B^*}''}$ through a plurality of methods. In an embodiment, the third rotation angle $\theta_z$ may be obtained according to a difference of two angles, respectively denoted by a world angle formed between the world projection vector $\overrightarrow{P_A \cdot P_{B^*}}$ and the world first coordinate axis or the world second coordinate axis in the world coordinate system, and the intermediate angle formed between the intermediate projection vector $\overrightarrow{P_{A^*}'' P_{B^*}''}$ and the intermediate first coordinate axis or the intermediate second coordinate axis in the second intermediate coordinate system. Nevertheless, the disclosure is not limited thereto.

To be specific, the first intermediate coordinate system is obtained after the origin of the world coordinate system is translated, and the second intermediate coordinate system is obtained after rotation is performed around the intermediate third coordinate axis through the third rotation angle $\theta_z$. Therefore, for the intermediate first coordinate axes X' and X", when the X' axis of the first intermediate coordinate system is transformed to the X" axis of the second intermediate coordinate system, the angle between the X" axis and the X' axis is equal to the third rotation angle $\theta_z$. Similarly, for the intermediate second coordinate axes Y' and Y", when the Y' axis of the first intermediate coordinate system is transformed to the Y" axis of the second intermediate coordinate system, the angle between the Y" axis and the Y' axis is equal to the third rotation angle $\theta_z$.

In this embodiment, through the inner product of the world projection vector $\overrightarrow{P_A \cdot P_{B^*}}$ and the vector (1,0) of the X axis of the world coordinate system on the XY plane, the cosine value of the world angle formed by the world projection vector $\overrightarrow{P_A \cdot P_{B^*}}$ and the X axis is obtained and is expressed as formula (27):

$$\cos\theta_{z,1}^* = \frac{X_B - X_A}{\sqrt{(X_B - X_A)^2 + (Y_B - Y_A)^2}} \quad (27)$$

so that the world angle $\theta_{z,1}$ may be expressed as formula (28):

$$\theta_{z,1} = \begin{cases} \theta_{z,1}^* & Y_B \geq Y_A \\ -\theta_{z,1}^* & Y_B < Y_A \end{cases},$$

$$\theta_{z,1}^* = \cos^{-1}\left(\frac{X_B - X_A}{\sqrt{(X_B - X_A)^2 + (Y_B - Y_A)^2}}\right). \quad (28)$$

Further, in this embodiment, through the slope of the intermediate projection vector $\overrightarrow{P_{A^*}'' P_{B^*}''}$ on the X"Y" plane of the second intermediate coordinate system, the tangent value of the intermediate angle formed between the intermediate projection vector $\overrightarrow{P_{A^*}'' P_{B^*}''}$ and the X" axis may be obtained and expressed as formula (29):

$$\tan\theta_{z,2}^* = \frac{Y_B'' - Y_A''}{X_B'' - X_A''} \quad (29)$$

so that the intermediate angle $\theta_{z,2}$ may be further expressed as formula (30):

$$\theta_{z,2} = \begin{cases} \theta_{z,2}^* & X_B'' \geq X_A'' \\ \theta_{z,2}^* + \pi & X_B'' < X_A'', \theta_{z,2}^* \leq 0 \\ \theta_{z,2}^* - \pi & X_B'' < X_A'', \theta_{z,2}^* > 0 \end{cases} \text{ where} \quad (30)$$

$$\theta_{z,2}^* = \begin{cases} \frac{\pi}{2} & X_B'' = X_A'' \\ \tan^{-1}\left(\frac{Y_B'' - Y_A''}{X_B'' - X_A''}\right) & X_B'' \neq X_A'' \end{cases}.$$

Accordingly, the angle difference between the world angle $\theta_{z,1}$ and the intermediate angle $\theta_{z,2}$ is the third rotation angle $\theta_z$ and is expressed as formula (31):

$$\theta_z = \theta_{z,1} - \theta_{z,2} \quad (31)$$

That is, the third rotation angle obtained by the processor 130 according to the angle difference between the world angle and the intermediate angle may be expressed as, for example, formulas (28), (30), and (31), but the disclosure is not limited thereto.

How the third rotation angle $\theta_z$ may be obtained according to the world projection vector $\overrightarrow{P_A \cdot P_{B^*}}$ and the intermediate projection vector $\overrightarrow{P_{A^*}'' P_{B^*}''}$ is described in another embodiment as follows. In this embodiment, the third rotation angle $\theta_z$ is obtained according to the angle between the world projection vector $\overrightarrow{P_A \cdot P_{B^*}}$ and the intermediate projection vector $\overrightarrow{P_{A^*}'' P_{B^*}''}$.

To be specific, the first intermediate coordinate system is obtained after the origin of the world coordinate system is translated, and the second intermediate coordinate system is obtained after rotation is performed around the intermediate third coordinate axis through the third rotation angle $\theta_z$. Therefore, for the reference vector formed by the two reference points $P_A$ and $P_B$, the rotation angle required to transform the direction of the intermediate projection vector $\overrightarrow{P_{A^*}'' P_{B^*}''}$ in the second intermediate coordinate system to the direction of the world projection vector $\overrightarrow{P_A \cdot P_{B^*}}$ in the world coordinate system is equal to the third rotation angle $\theta_z$.

In this embodiment, through the inner product of the world projection vector $\overrightarrow{P_A \cdot P_{B^*}}$ and the intermediate projection vector $\overrightarrow{P_{A^*}'' P_{B^*}''}$, the cosine value of the angle between the world projection vector $\overrightarrow{P_A \cdot P_{B^*}}$ and the intermediate projection vector $\overrightarrow{P_{A^*}'' P_{B^*}''}$ is obtained and is expressed as formula (32):

$$\cos\theta_Z^* = \frac{\overrightarrow{P_{A^*} P_{B^*}} \cdot \overrightarrow{P_{A^*}'' P_{B^*}''}}{|\overrightarrow{P_{A^*} P_{B^*}}||\overrightarrow{P_{A^*}'' P_{B^*}''}|} \quad (32)$$

-continued $$= \frac{(X_B - X_A)(X_B'' - X_A'') + (Y_B - Y_A)(Y_B'' - Y_A'')}{\sqrt{(X_B - X_A)^2 + (Y_B - Y_A)^2} \sqrt{(X_B'' - X_A'')^2 + (Y_B'' - Y_A'')^2}}$$

so that the world angle $\theta_z$ may be expressed as formula (33):

$$\theta_Z = \begin{cases} \theta_z^* & Y_B - Y_A \geq Y_B'' - Y_A'' \\ -\theta_z^* & Y_B - Y_A < Y_B'' - Y_A'' \end{cases} \text{ where} \quad (33)$$

$$\theta_z^* = \cos^{-1}\left(\frac{(X_B - X_A)(X_B'' - X_A'') + (Y_B - Y_A)(Y_B'' - Y_A'')}{\sqrt{(X_B - X_A)^2 + (Y_B - Y_A)^2} \sqrt{(X_B'' - X_A'')^2 + (Y_B'' - Y_A'')^2}}\right).$$

Based on the above, the processor 130 may obtain the analytic solutions of the focal length f of the camera 110, the first rotation angle $\theta_x$, the second rotation angle $\theta_y$, and the third rotation angle $\theta_z$ to form the coordinate transformation parameters.

How to transform the image coordinates of the object in the image coordinate system to the world coordinates of the object in the world coordinate system by applying coordinate transformation parameters is described as follows.

If the processor 130 knows that the image coordinates of the object in the image captured by the camera 110 are ($u_k$, $v_k$), the image coordinates corresponding to a straight line in the camera coordinate system and may be expressed as formula (34):

$$(\alpha f, \alpha u_A, \alpha v_A) \quad (34)$$

where $\alpha$ is any value greater than 0.

The processor 130 may further obtain the world coordinates of the object in the world coordinate system according to the obtained focal length f, the first rotation angle $\theta_x$, the second rotation angle $\theta_y$, and the third rotation angle $\theta_z$. For instance, in an embodiment of the disclosure, the processor 130 may obtain the world coordinates through formulas (34), (3) and (4) as described above, and related description is thus omitted.

In contrast, if the processor 130 knows a world coordinates ($X_k$, $Y_k$, $Z_k$) in the world coordinate system, the processor 130 may transform the world coordinates in the world coordinate system to the camera coordinates ($x_k$, $y_k$, $z_k$) in the camera coordinate system. For instance, the process of transforming the world coordinates in the world coordinate system to the camera coordinates in the camera coordinate system by the processor 130 may be expressed as formulas (1) and (2) as described above, and related description is thus omitted.

In addition, the processor 130 further transforms the world coordinates ($X_k$, $Y_k$, $Z_k$) in the world coordinate system to the image coordinates ($u_k$, $v_k$) in the image coordinate system. For instance, transformation from the world coordinates to the image coordinates may be expressed as formula (35):

$$\begin{bmatrix} u_k \\ v_k \end{bmatrix} = \gamma M \begin{bmatrix} X_k - X_0 \\ Y_k - Y_0 \\ Z_k - Z_0 \end{bmatrix} \quad (35)$$

where the matrix M is a 2×3 matrix, and elements of M are respectively expressed as formulas (36):

$m_{1,1} = \sin\theta_x \sin\theta_y \cos\theta_z - \cos\theta_x \sin\theta_z$, $m_{1,2} = \sin\theta_x \sin\theta_y \sin\theta_z + \cos\theta_x \cos\theta_z$, $m_{1,3} = \sin\theta_x \cos\theta_y$, $m_{2,1} = \cos\theta_x \sin\theta_y \cos\theta_z + \sin\theta_x \sin\theta_z$, $m_{2,2} = \cos\theta_x \sin\theta_y \sin\theta_z - \sin\theta_x \cos\theta_z$, $m_{2,3} = \cos\theta_x \cos\theta_y$. (36)

Herein, i in $m_{i,j}$ represents an index of rows in the matrix M, and j represents an index of columns in the matrix M. In addition, the parameter $\gamma$ may be expressed as formula (37):

$$\gamma = \frac{f}{\cos\theta_y \cos\theta_z (X_k - X_0) + \cos\theta_y \sin\theta_z (Y_k - Y_0) - \sin\theta_y (Z_k - Z_0)} \quad (37)$$

The world coordinates ($X_k$, $Y_k$, $Z_k$) in the world coordinate system, the world coordinates ($X_0$, $Y_0$, $Z_0$) of the camera, the first rotation angle $\theta_x$, the second rotation angle $\theta_y$, and the third rotation angle $\theta_z$ are all known, and f is also known. Image coordinates ($u_k$, $v_k$) may thereby be obtained.

Accordingly, the transformation from the world coordinates in the world coordinate system to the image coordinates in the image coordinate system by the processor 130 may be expressed as, for example, formulas (35) to (37). Alternatively, the transformation from the image coordinates in the image coordinate system to the world coordinates in the world coordinate system by the processor 130 may be expressed as, for example, formulas (34) and (3) to (4). That is, through the coordinate transformation parameters, when obtaining the world coordinates of the object in the world coordinate system or the image coordinates of the object in the image coordinate system, the processor 130 may instantly transform the world coordinates of the object in the world coordinate system to the image coordinates of the object in the image coordinate system or transform the image coordinates of the object in the image coordinate system to the world coordinates of the object in the world coordinate system.

Details of obtaining the plurality of coordinate transformation parameters relative to the transformation between any image coordinates and any world coordinates corresponding to the camera through the world coordinates of the camera, the world coordinates of the two reference points, and the image coordinates of the corresponding projection points in the image coordinate system are described by adopting a second embodiment.

Note that in this embodiment, the world coordinate system and the camera coordinate system are the right-handed coordinate system. That is, the right thumb points in the positive direction of the Z axis, and the rest of the four fingers are curled in a direction of rotating from the positive direction of the X axis to the positive direction of the Y axis. Similar to the foregoing embodiments, the lens central point of the camera acts as the origin (0, 0, 0) in the camera coordinate system, the direction looking straight ahead the camera lens acts as the positive direction of the x axis, and vertical direction relative to the direction looking straight ahead the camera 110 acts as the positive direction of the z axis. Nevertheless, different from the foregoing embodiments, according to the vector corresponding to the right-handed coordinate system, the horizontal left direction relative to the direction looking straight ahead the camera 110 is the positive direction of the y axis of the camera coordinate system in this embodiment, but the disclosure is not limited thereto.

Similar to the foregoing embodiments, when the coordinate transformation parameters relative to the transformation between any image coordinates and any world coordinates corresponding to the camera are obtained, the first intermediate coordinate system, the second intermediate coordinate system, and the third intermediate coordinate system are applied in this embodiment to obtain the coordinate transformation parameters. Corresponding to each of the coordinate systems, a first coordinate axis is the X axis of the coordinate system, a second coordinate axis is the Y axis of the coordinate system, and a third coordinate axis is the Z axis of the coordinate system. Nevertheless, the disclosure is not limited thereto. Moreover, same as the foregoing embodiments, in this embodiment, the first intermediate coordinate system is obtained through translation of the origin to the world coordinates $(X_0, Y_0, Z_0)$ in the world coordinate system. The second intermediate coordinate system is obtained through rotation of the first intermediate coordinate system about the intermediate third coordinate axis (i.e., the Z' axis) through the third rotation angle $\theta_z$. The third intermediate coordinate system is obtained through rotation of the second intermediate coordinate system about the intermediate second coordinate axis (i.e., the Y" axis) through the second rotation angle $\theta_y$, and at last, the camera coordinate system is obtained through rotation of the third intermediate coordinate system about the intermediate first coordinate axis (i.e., the X'" axis) through the first rotation angle $\theta_x$.

If the world coordinates of the object in the world coordinate system are $(X_k, Y_k, Z_k)$, the camera coordinates $(x_k, y_k, z_k)$ of the object in the camera coordinate system may be obtained by the coordinate transformation formulas (1) and (2), and related description is thus omitted.

In contrast, if the camera coordinates of the object in the camera coordinate system are $(x_k, y_k, z_k)$, the world coordinates $(X_k, Y_k, Z_k)$ of the object in the world coordinate system may be obtained through the coordinate transformation formulas (3) and (4), and related description is thus omitted.

Identical to the foregoing embodiments, in this embodiment, the processor 130 obtains the focal length f according to the two reference points $P_A$ and $P_B$ and the corresponding two projection points $p_A$ and $p_B$ as well through the Pythagorean theorem and the law of cosines. Related description is thus omitted.

The process of obtaining the first rotation angle $\theta_x$, the second rotation angle $\theta_y$, and the third rotation angle $\theta_z$ are similar to but slightly different from that of the foregoing embodiments. How the first rotation angle $\theta_x$, the second rotation angle $\theta_y$, and the third rotation angle $\theta_z$ are obtained in this embodiment is described as follows. First, if the coordinates of the object in the camera coordinate system are $(x_k, y_k, z_k)$, the coordinates of the object in the second intermediate coordinate system are expressed as formula (13). In this embodiment, the image coordinates of the first projection point $p_A$ and the second projection point $p_B$ on the projection plane respectively are $(u_A, v_A)$ and $(u_B, v_B)$, so the camera coordinates of the two reference points $P_A$ and $P_B$ in the camera coordinate system respectively are $(\alpha f, -\alpha u_A, \alpha v_A)$ and $(\beta f, -\beta u_B, \beta v_B)$. Therefore, according to formula (13), $(x_k, y_k, z_k)$ of formula (13) is substituted for $(\alpha f, -\alpha u_A, \alpha v_A)$ and $(\beta f, -\beta u_B, \beta v_B)$, and the coordinate values of the intermediate third coordinate axis of the two reference points $P_A$ and $P_B$ in the second intermediate coordinate system may respectively be expressed as $(-\alpha s \sin \theta_y - \alpha u_A \sin \theta_x \cos \theta_y + \alpha v_A \cos \theta_x \cos \theta_y)$ and $(-\beta f \sin \theta_y - \beta u_B \sin \theta_x \cos \theta_y + \beta v_B \cos \theta_x \cos \theta_y)$. Moreover, in this embodiment, it is assumed that the two reference points $P_A$ and $P_B$ are located on the ground, and thereby, the coordinate values of the intermediate third coordinate axis of the two reference points in the second intermediate coordinate system are both be set as $-h$. Transformation may be made through formula (38) and formula (39):

$$-\alpha f \sin \theta_y - \alpha u_A \sin \theta_x \cos \theta_y + \alpha v_A \cos \theta_x \cos \theta_y = -h \quad (38)$$

$$-\beta f \sin \theta_y - \beta u_B \sin \theta_x \cos \theta_y + \beta v_B \cos \theta_x \cos \theta_y = -h \quad (39)$$

where $\alpha$, $\beta$, and f are all known. Further, correlations between the first rotation angle $\theta_x$, the second rotation angle $\theta_y$, obtained by the processor 130, and the two projection points $p_A$ and $p_B$ of the two reference points $P_A$ and $P_B$ may be expressed as formulas (38) and (39).

Identical to the foregoing embodiments, the formulas (16), (17), and (18), the processor 130 may obtain the values of $\cos^2\theta_x$ and $\cos^2\theta_y$. Further, the processor 130 makes selection according to formulas (38) and (39) as well to obtain the correct $\theta_x$ and $\theta_y$.

Next, identical to the foregoing embodiments, the processors 130 obtains the world projection vector $\overrightarrow{P_A'P_B'}$ of the reference vector $\overrightarrow{P_AP_B}$ formed by the two reference points $P_A$ and $P_B$ projected on the world plane (e.g., the XY plane) perpendicular to the world third coordinate axis in the world coordinate system, and the world projection vector may be expressed as formula (24), so related description is thus omitted.

Further, the processor 130 obtains the intermediate projection vector $\overrightarrow{P_A''P_B''}$ of the reference vector $\overrightarrow{P_AP_B}$ formed by the two reference points $P_A$ and $P_B$ projected on the intermediate plane (e.g., the X"Y" plane) perpendicular to the intermediate third coordinate axis in the second intermediate coordinate system, and the intermediate projection vector may be expressed as formula (25). Nevertheless, different from the foregoing embodiments, the camera coordinates of the two reference points $P_A$ and $P_B$ in the camera coordinate system respectively are $(\alpha f, -\alpha u_A, \alpha v_A)$ and $(\beta f, -\beta u_B, \beta v_B)$ in this embodiment, and thereby, according to formula (13), $X"_A$, $X"_B$, $Y"_A$, and $Y"_B$ are expressed as formulas (40):

$$X_A"=\alpha(f\cos\theta_y - u_A\sin\theta_x\sin\theta_y + v_A\cos\theta_x\sin\theta_y),$$

$$X_B"=\beta(f\cos\theta_y - u_B\sin\theta_x\sin\theta_y + v_B\cos\theta_x\sin\theta_y),$$

$$Y_A"=\alpha(u_A\cos\theta_x + v_A\sin\theta_x),$$

$$Y_B"=\beta(u_B\cos\theta_x + v_B\sin\theta_x). \quad (40)$$

Finally, the processor 130 obtains the third rotation angle $\theta_z$ according to the world projection vector $\overrightarrow{P_A'P_B'}$ and the intermediate projection vector $\overrightarrow{P_A''P_B''}$. Similar to the foregoing embodiments, the processor 130 may obtain the third rotation angle $\theta_z$ according to the angle difference between the world angle formed between the world projection vector $\overrightarrow{P_A'P_B'}$ and the world first coordinate axis or the world second coordinate axis in the world coordinate system and the intermediate angle formed between the intermediate projection vector $\overrightarrow{P_A''P_B''}$ and the intermediate first coordinate axis or the intermediate second coordinate axis in the second intermediate coordinate system, and the third rotation angle may be expressed as formulas (40), (28), (30), and (31). Alternatively, the processor 130 may obtain the third rotation angle $\theta_z$ according to the angle between the world projection vector $\overrightarrow{P_A \cdot P_B}$ and the intermediate projection vector $\overrightarrow{P_A''P_B''}$, and the third rotation angle may be expressed as, for example, formulas (40) and (33). Nevertheless, the disclosure is not limited thereto.

Based on the above, the processor 130 may obtain the analytic solutions of the focal length f of the camera 110, the first rotation angle $\theta_x$, the second rotation angle $\theta_y$, and the third rotation angle $\theta_z$ to form the coordinate transformation parameters.

How to transform the image coordinates of the object in the image coordinate system to the world coordinates of the object in the world coordinate system by applying coordinate transformation parameters is described as follows.

If the processor 130 knows that the image coordinates of the object in the image captured by the camera 110 are ($u_k$, $v_k$), in this embodiment, the image coordinates corresponding to a straight line in the camera coordinate system and may be expressed as formula (41):

$$(\alpha f, -\alpha u_A, \alpha v_A) \qquad (41)$$

where $\alpha$ is any value greater than 0.

The processor 130 may further obtain the world coordinates of the object in the world coordinate system according to the obtained focal length f, the first rotation angle $\theta_x$, the second rotation angle $\theta_y$, and the third rotation angle $\theta_z$. For instance, in an embodiment of the disclosure, the processor 130 may obtain the world coordinates through formulas (41), (3) and (4) as described above, and related description is thus omitted.

In contrast, if the processor 130 knows a world coordinates ($X_k, Y_k, Z_k$) in the world coordinate system, the processor 130 may transform the world coordinates in the world coordinate system to the camera coordinates ($x_k, y_k, z_k$) in the camera coordinate system. For instance, the process of transforming the world coordinates in the world coordinate system to the camera coordinates in the camera coordinate system by the processor 130 may be expressed as formulas (1) and (2) as described above, and related description is thus omitted.

In addition, the processor 130 further transforms the world coordinates ($X_k, Y_k, Z_k$) in the world coordinate system to the image coordinates ($u_k, v_k$) in the image coordinate system. For instance, the world coordinates may be transformed to the image coordinates and may be expressed as, for example, formula (35), where the matrix M is a 2×3 matrix, and different from the foregoing embodiments, in this embodiment, the elements of M may be expressed as formulas (42):

$$m_{1,1} = -\sin\theta_x \sin\theta_y \cos\theta_z + \cos\theta_x \sin\theta_z,$$

$$m_{1,2} = -\sin\theta_x \sin\theta_y \sin\theta_z - \cos\theta_x \cos\theta_z,$$

$$m_{1,3} = -\sin\theta_x \cos\theta_y,$$

$$m_{2,1} = \cos\theta_x \sin\theta_y \cos\theta_z + \sin\theta_x \sin\theta_z,$$

$$m_{2,2} = \cos\theta_x \sin\theta_y \sin\theta_z - \sin\theta_x \cos\theta_z,$$

$$m_{2,3} = \cos\theta_x \cos\theta_y. \qquad (42)$$

Herein, i in $m_{i,j}$ represents the index of rows in the matrix M, and j represents the index of columns in the matrix M. In addition, the parameter $\gamma$ may be expressed as formula (37).

Accordingly, the transformation from the world coordinates in the world coordinate system to the image coordinates in the image coordinate system by the processor 130 may be expressed as, for example, formulas (35), (37), and (42). Alternatively, the transformation from the image coordinates in the image coordinate system to the world coordinates in the world coordinate system by the processor 130 may be expressed as, for example, formulas (41), (3), and (4). That is, through the coordinate transformation parameters, when obtaining the world coordinates of the object in the world coordinate system or the image coordinates of the object in the image coordinate system, the processor 130 may instantly transform the world coordinates of the object in the world coordinate system to the image coordinates of the object in the image coordinate system, or transform the image coordinates of the object in the image coordinate system to the world coordinates of the object in the world coordinate system.

Details of obtaining the plurality of coordinate transformation parameters relative to the transformation between any image coordinates and any world coordinates corresponding to the camera through the world coordinates of the camera, the world coordinates of the two reference points, and the image coordinates of the corresponding projection points in the image coordinate system are described by adopting a third embodiment.

Similar to the foregoing embodiments, the world coordinate system and the camera coordinate system are the right-handed coordinate system in this embodiment. Moreover, in the camera coordinate system, the lens central point of the camera acts as the origin (0, 0, 0) of the camera coordinate system. Nevertheless, different from the foregoing embodiments, the direction looking straight ahead the camera lens acts as the positive direction of the y axis of the camera coordinate system. Further, according to the vector corresponding to the right-handed coordinate system, the horizontal right direction relative to the direction looking straight ahead the camera 110 is further determined to be the positive direction of the x axis of the camera coordinate system, and the vertical up direction relative to the direction looking straight ahead the camera 110 is further determined to be the positive direction of the z axis of the camera coordinate system. Nevertheless, the disclosure is not limited thereto. Moreover, when the rotation angle of the camera 110 around the y axis is not zero, the horizontal and vertical directions of the real world reflected in the image frame captured by the camera are not identical to the directions of the u axis and the v axis of the image coordinate system.

Besides, when the coordinate transformation parameters relative to the transformation between any image coordinates and any world coordinates corresponding to the camera are obtained, the first intermediate coordinate system, the second intermediate coordinate system, and the third intermediate coordinate system are applied to obtain the coordinate transformation parameters. To be specific, a Cartesian coordinate system in the three-dimensional space is adopted by both the world coordinate system and the camera coordinate system. In this way, numerical dependency (e.g., dependencies of angles, distances and the like) therebetween is provided. The first intermediate coordinate system, the second intermediate coordinate system, and the third intermediate coordinate system are coordinate systems formed in the intermediate of transformation from the world coordinate system to the camera coordinate system. Further, corresponding to each of the coordinate systems, the first coordinate axis is the X axis of the coordinate system, the second coordinate axis is the Y axis of the coordinate system, and the third coordinate axis is the Z axis of the coordinate system. For instance, corresponding to the world coordinate system, the (world) first coordinate axis, the (world) second coordinate axis, and the (world) third coordinate axis respectively are the X axis, the Y axis, and the Z axis of the world coordinate system. Corresponding to the first intermediate coordinate system, the (intermediate) first coordinate axis, the (intermediate) second coordinate axis, and the (intermediate) third coordinate axis respectively are the X' axis, the Y' axis, and the Z' axis of the first intermediate coordinate system. Corresponding to the second intermediate coordinate system, the (intermediate) first coordinate axis, the (intermediate) second coordinate axis, and the (intermediate) third coordinate axis respectively are the X" axis, the Y" axis, and the Z" axis of the second intermediate coordinate system. Corresponding to the third intermediate coordinate system, the (intermediate) first coordinate axis, the (intermediate) second coordinate axis, and the (intermediate) third coordinate axis respectively are the X''' axis, the Y''' axis, and the Z''' axis of the third intermediate coordinate system. Corresponding to the camera coordinate system, the (camera) first coordinate axis, the (camera) second coordinate axis, and the (camera) third coordinate axis respectively are the x axis, the y axis, and the z axis of the camera coordinate system. Nevertheless, the disclosure is not limited thereto.

Similar to the embodiments of FIG. 3 to FIG. 7, in this embodiment, when obtaining the coordinate transformation parameters relative to the transformation between any image coordinates and any world coordinates corresponding to the camera, the processor 130 applies the first intermediate coordinate system, the second intermediate coordinate system, and the third intermediate coordinate system to obtain the coordinate transformation parameters. Moreover, similar to the foregoing embodiments, the first intermediate coordinate system is obtained through translation of the origin to the world coordinates $(X_0, Y_0, Z_0)$ in the world coordinate system. The second intermediate coordinate system is obtained through rotation of the first intermediate coordinate system about the intermediate third coordinate axis (i.e., the Z' axis) through the third rotation angle $\theta_z$. Nevertheless, different from the foregoing embodiments, in this embodiment, the third intermediate coordinate system is obtained through rotation of the second intermediate coordinate system about the intermediate first coordinate axis (i.e., the X" axis) through the first rotation angle $\theta_x$, and at last, the camera coordinate system is obtained through rotation of third intermediate coordinate system about the intermediate second coordinate axis (i.e., the Y''' axis) through the second rotation angle $\theta_y$. Translation and rotation of the world coordinate system in this embodiment are similar to that in the embodiment of FIG. 3, and the only difference is the order of rotation about the axes. Therefore, related details are omitted herein.

If the world coordinates of the object in the world coordinate system are $(X_k, Y_k, Z_k)$, the camera coordinates $(x_k, y_k, z_k)$ of the object in the camera coordinate system may be expressed by adopting the following coordinate transformation formula (43):

$$\begin{bmatrix} x_k \\ y_k \\ z_k \end{bmatrix} = M_y M_x M_z \begin{bmatrix} X_k - X_0 \\ Y_k - Y_0 \\ Z_k - Z_0 \end{bmatrix} \tag{43}$$

where the order of which the matrixes $M_x$, $M_y$, and $M_z$ are calculated corresponds to the process of transformation from the world coordinate system to the camera coordinate system. Description of the matrixes $M_x$, $M_y$, and $M_z$ are similar to that provided for formula (2), and related description is thus omitted.

In contrast, if the coordinates of the object in the camera coordinate system are $(x_k, y_k, z_k)$, the world coordinates $(X_k, Y_k, Z_k)$ of the object in the world coordinate system may be expressed by adopting the following coordinate transformation formula (44):

$$\begin{bmatrix} X_k \\ Y_k \\ Z_k \end{bmatrix} = M_z^{-1} M_x^{-1} M_y^{-1} \begin{bmatrix} x_k \\ y_k \\ z_k \end{bmatrix} + \begin{bmatrix} X_0 \\ Y_0 \\ Z_0 \end{bmatrix} \tag{44}$$

where the order of which the matrixes $M_x^{-1}$, $M_y^{-1}$, and $M_z^{-1}$ are calculated corresponds to the process of transformation from the camera coordinate system to the world coordinate system. Description of the matrixes $M_x^{-1}$, $M_y^{-1}$, and $M_z^{-1}$ are similar to that provided for formula (4), and related description is thus omitted.

Identical to the foregoing embodiments, in this embodiment, the processor 130 obtains the focal length f according to the two reference points $P_A$ and $P_B$ and the corresponding two projection points $p_A$ and $p_B$ as well through the Pythagorean theorem and the law of cosines. Related description is thus omitted.

The process of obtaining the first rotation angle $\theta_x$, the second rotation angle $\theta_y$, and the third rotation angle $\theta_z$ are similar to but slightly different from that of the foregoing embodiments. How the first rotation angle $\theta_x$, the second rotation angle $\theta_y$, and the third rotation angle $\theta_z$ are obtained in this embodiment is described as follows. First, if the coordinates of the object in the camera coordinate system are $(x_k, y_k, z_k)$, the coordinates of the object in the second intermediate coordinate system are expressed as formula (45):

$$\begin{bmatrix} X_k'' \\ Y_k'' \\ Z_k'' \end{bmatrix} = \begin{bmatrix} 1 & 0 & 0 \\ 0 & \cos\theta_x & -\sin\theta_x \\ 0 & \sin\theta_x & \cos\theta_x \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} x_k \\ y_k \\ z_k \end{bmatrix} \tag{45}$$

$$= \begin{bmatrix} \cos\theta_y & 0 & \sin\theta_y \\ \sin\theta_x\sin\theta_y & \cos\theta_x & -\sin\theta_x\cos\theta_y \\ -\cos\theta_x\sin\theta_y & \sin\theta_x & \cos\theta_x\cos\theta_y \end{bmatrix} \begin{bmatrix} x_k \\ y_k \\ z_k \end{bmatrix}$$

In this embodiment, the image coordinates of the first projection point $p_A$ and the second projection point $p_B$ on the projection plane respectively are $(u_A, v_A)$ and $(u_B, v_B)$, so the camera coordinates of the two reference points $P_A$ and $P_B$ in the camera coordinate system respectively are $(\alpha u_A, \alpha f, \alpha v_A)$ and $(\beta u_B, \beta f, \beta v_B)$. Therefore, according to formula (45), $(x_k, y_k, z_k)$ of formula (45) is substituted for $(\alpha u_A, \alpha f, \alpha v_A)$ and $(\beta u_B, \beta f, \beta v_B)$. The coordinate values of the intermediate third coordinate axis of the two reference points $P_A$ and $P_B$ in the second intermediate coordinate system may respectively be expressed as $(-\alpha u_A \cos\theta_x \sin\theta_y + \alpha f \sin\theta_x + \alpha v_A \cos\theta_x \cos\theta_y)$ and $(-\beta u_B \cos\theta_x \sin\theta_y + \beta f \sin\theta_x + \beta v_B \cos\theta_x \cos\theta_y)$. Moreover, in this embodiment, since it is assumed that the two reference points $P_A$ and $P_B$ are located on the ground, the coordinate values of the intermediate third coordinate axis of the two reference points in the second intermediate coordinate system are both be set as –h. Transformation may be made through formula (46) and formula (47):

$$-\alpha u_A \cos\theta_x \sin\theta_y + \alpha f \sin\theta_x + \alpha v_A \cos\theta_x \cos\theta_y = -h \quad (46)$$

$$-\beta u_B \cos\theta_x \sin\theta_y + \beta f \sin\theta_x + \beta v_B \cos\theta_x \cos\theta_y = -h \quad (46)$$

where $\alpha$, $\beta$, and f are all known.

Herein, correlations between the first rotation angle $\theta_x$ and the second rotation angle $\theta_y$ and the two projection points $p_A$ and $p_B$ of the two reference points $P_A$ and $P_B$ obtained by the processor 130 may be expressed as formulas (46) and (47). Calculations of formulas (46) and (47) to obtain $\theta_x$ and $\theta_y$ can be easily understood by people having ordinary skill in the art, and the disclosure is not limited thereto. In an embodiment, the value of $\cos^2\theta_x$ and $\cos^2\theta_y$ can be obtained through formulas (48) and (49):

$$\cos^2\theta_x = \frac{-\left(2PQ + \frac{q}{p}R^2\right) \pm R\sqrt{R^2\left(\frac{q}{p}\right)^2 + 4PQ\frac{q}{p} - 4P^2\frac{r}{p}}}{2P^2} \quad (48)$$

$$\cos^2\theta_y = -\frac{1}{p}\left(q + \frac{r}{\cos^2\theta_x}\right) \quad (49)$$

where the parameters P, Q, R, p, q, and r are respectively expressed as formulas (18).

Similar to the foregoing embodiment, further, the processor 130 makes selection according to formulas (46) and (47) as well to obtain the correct $\theta_x$ and $\theta_y$.

Next, identical to the foregoing embodiments, the processors 130 obtains the world projection vector $\overline{P_A P_B}$ of the reference vector $\overline{P_A P_B}$ formed by the two reference points $P_A$ and $P_B$ projected on the world plane (e.g., the XY plane) perpendicular to the world third coordinate axis in the world coordinate system, and the world projection vector may be expressed as formula (24), so related description is thus omitted.

Further, the processor 130 obtains the intermediate projection vector $\overline{P''_A P''_B}$ of the reference vector $\overline{P_A P_B}$ formed by the two reference points $P_A$ and $P_B$ projected on the intermediate plane (e.g., the X" Y" plane) perpendicular to the intermediate third coordinate axis in the second intermediate coordinate system, and the intermediate projection vector may be expressed as formula (25). Nevertheless, different from the foregoing embodiments, the camera coordinates of the two reference points $P_A$ and $P_B$ in the camera coordinate system respectively are $(\alpha u_A, \alpha f, \alpha v_A)$ and $(\beta u_B, \beta f, \beta v_B)$ in this embodiment, and thereby, according to formula (45), $X''_A$, $X''_B$, $Y''_A$, and $Y''_B$ are expressed as formulas (50):

$$X''_A = \alpha(u_A \cos\theta_y + v_A \sin\theta_y),$$

$$X''_A = \beta(u_A \cos\theta_y + v_B \sin\theta_y),$$

$$Y''_A = \alpha(u_A \sin\theta_x \sin\theta_y + f \cos\theta_x - v_A \sin\theta_x \cos\theta_y),$$

$$Y''_B = \beta(u_B \sin\theta_x \sin\theta_y + f \cos\theta_x - v_B \sin\theta_x \cos\theta_y). \quad (50)$$

Finally, the processor 130 obtains the third rotation angle $\theta_z$ according to the world projection vector $\overline{P_A P_B}$ and the intermediate projection vector $\overline{P''_A P''_B}$. Similar to the foregoing embodiments, the processor 130 may obtain the third rotation angle $\theta_z$ according to the angle difference between the world angle formed between the world projection vector $\overline{P_A P_B}$ and the world first coordinate axis or the world second coordinate axis in the world coordinate system and the intermediate angle formed between the intermediate projection vector $\overline{P''_A P''_B}$ and the intermediate first coordinate axis or the intermediate second coordinate axis in the second intermediate coordinate system, and the third rotation angle may be expressed as formulas (50), (28), (30), and (31). Alternatively, the processor 130 may obtain the third rotation angle $\theta_z$ according to the angle between the world projection vector $\overline{P_A P_B}$ and the intermediate projection vector $\overline{P''_A P''_B}$, and the third rotation angle may be expressed as, for example, formulas (50) and (33). Nevertheless, the disclosure is not limited thereto.

Based on the above, the processor 130 may obtain the analytic solutions of the focal length f of the camera 110, the first rotation angle $\theta_x$, the second rotation angle $\theta_y$, and the third rotation angle $\theta_z$ to form the coordinate transformation parameters.

How to transform the image coordinates of the object in the image coordinate system to the world coordinates of the object in the world coordinate system by applying coordinate transformation parameters is described as follows.

If the processor 130 knows that the image coordinates of the object in the image captured by the camera 110 are $(u_k, v_k)$, in this embodiment, the image coordinates corresponding to a straight line in the camera coordinate system and may be expressed as formula (51):

$$(\alpha u_A, \alpha f, \alpha v_A) \quad (51)$$

where $\alpha$ is any value greater than 0.

The processor 130 may further obtain the world coordinates of the object in the world coordinate system according to the obtained focal length f, the first rotation angle $\theta_x$, the second rotation angle $\theta_y$, and the third rotation angle $\theta_z$. For instance, in an embodiment of the disclosure, the processor 130 may obtain the world coordinates through formulas (51), (44) and (4) as described above, and related description is thus omitted.

In contrast, if the processor 130 knows a world coordinates $(X_k, Y_k, Z_k)$ in the world coordinate system, the processor 130 may transform the world coordinates in the world coordinate system to the camera coordinates $(x_k, y_k, z_k)$ in the camera coordinate system. For instance, the process of transforming the world coordinates in the world coordinate system to the camera coordinates in the camera coordinate system by the processor 130 may be expressed as formulas (43) and (2) as described above, and related description is thus omitted.

In addition, the processor 130 further transforms the world coordinates $(X_k, Y_k, Z_k)$ in the world coordinate system to the image coordinates $(u_k, v_k)$ in the image coordinate system. For instance, the world coordinates may be transformed to the image coordinates and may be expressed as, for example, formula (35), where the matrix M is a 2×3 matrix, and different from the foregoing embodiments, in this embodiment, the elements of M may be expressed as formulas (52)

$$m_{1,1} = \cos\theta_y \cos\theta_z - \sin\theta_x \sin\theta_y \sin\theta_z,$$

$$m_{1,2} = \cos\theta_y \cos\theta_z + \sin\theta_x \sin\theta_y \cos\theta_z,$$

$$m_{1,3} = -\cos\theta_x \sin\theta_y,$$

$m_{2,1} = \sin\theta_y \cos\theta_z + \sin\theta_x \cos\theta_y \sin\theta_z,$ $m_{2,2} = \sin\theta_y \sin\theta_z - \sin\theta_x \cos\theta_y \cos\theta_z,$ $m_{2,3} = \cos\theta_x \cos\theta_y.$ (52)

Herein, i in $m_{i,j}$ represents the index of rows in the matrix M, and j represents the index of columns in the matrix M. In addition, the parameter γ may be expressed as formula (53):

$$\gamma = \frac{f}{-\cos\theta_x \sin\theta_z(X_k - X_0) + \cos\theta_x \cos\theta_z(Y_k - Y_0) + \sin\theta_x(Z_k - Z_0)} \quad (53)$$

Accordingly, the transformation from the world coordinates in the world coordinate system to the image coordinates in the image coordinate system by the processor 130 may be expressed as, for example, formulas (35), (52), and (53). Alternatively, the transformation from the image coordinates in the image coordinate system to the world coordinates in the world coordinate system by the processor 130 may be expressed as, for example, formulas (51), (44), and (4). That is, through the coordinate transformation parameters, when obtaining the world coordinates of the object in the world coordinate system or the image coordinates of the object in the image coordinate system, the processor 130 may instantly transform the world coordinates of the object in the world coordinate system to the image coordinates of the object in the image coordinate system or transform the image coordinates of the object in the image coordinate system to the world coordinates of the object in the world coordinate system.

Figure 8:
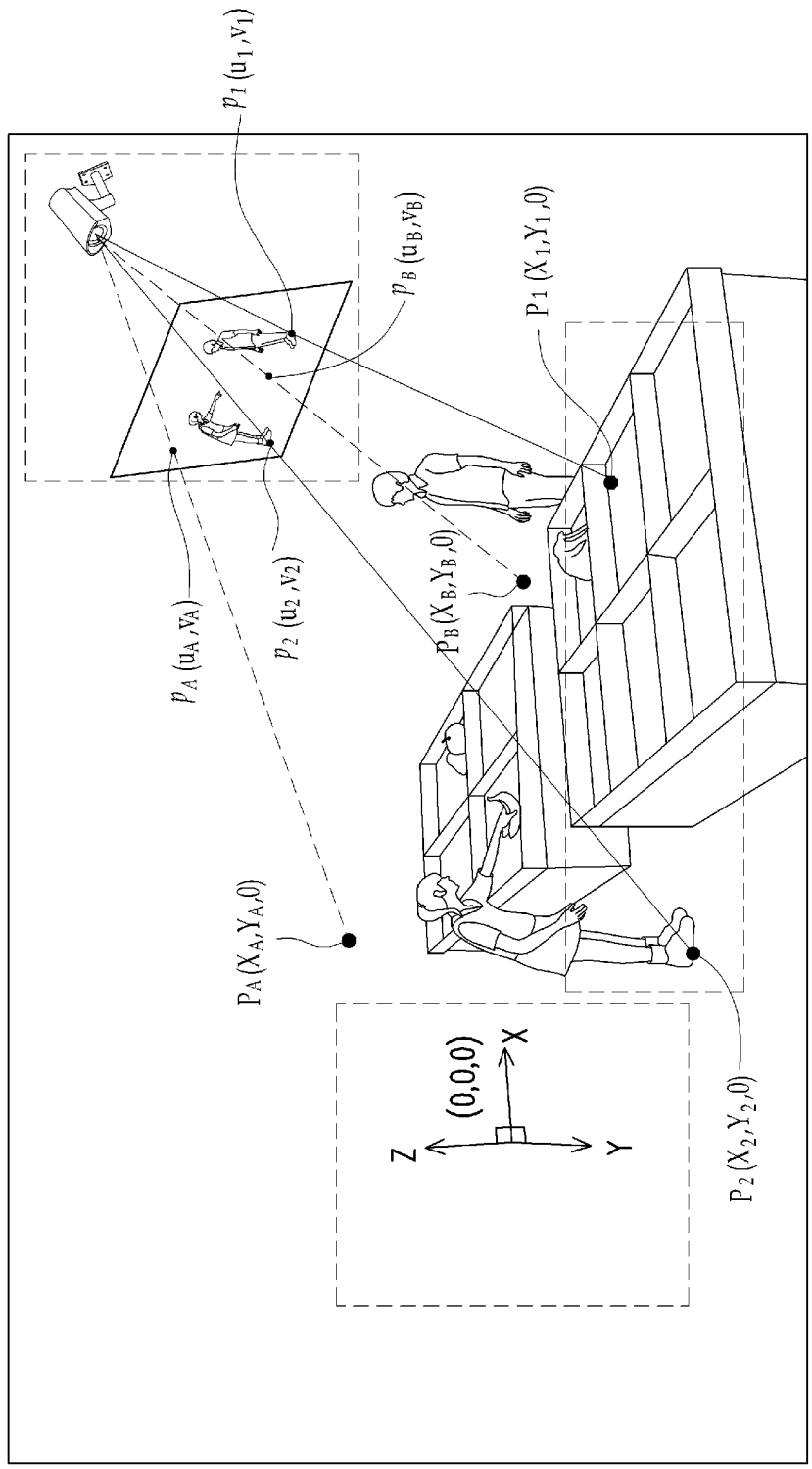
FIG. 8 is a schematic diagram illustrating a first scenario according to an embodiment of the disclosure.

FIG. 8 is a schematic diagram illustrating a first scenario according to an embodiment of the disclosure. With reference to FIG. 8, in an applicable scenario of this disclosure such as a surveillance system, a camera is installed in a fixed position and direction inside the field, around the field, or at the entrance and exit, etc. The field is, for example, an airport, a bank, an exhibition hall, a conference room, a store, a restaurant, a sports field, a residential community, a park, a road, and the like. When installation of the camera is completed, the coordinate transformation parameters are obtained first through the reference points $P_A$ and $P_B$ and the projection points $p_A$ and $p_B$ corresponding to the reference points $P_A$ and $P_B$ in the image captured by the camera. Accordingly, after the camera captures an image, the processor 130 may accordingly obtain the image coordinates (e.g., $p_1$ and $p_2$) of any target object such as a man, an animal, a car, an airplane, an exhibit, a product, a baseball, etc. in the image and transforms to the world coordinates (e.g., $P_1$ and $P_2$) corresponding to the target object in the world coordinate system. Details of obtaining any object image in the image and transforming to the world coordinates corresponding to the object are described in the foregoing embodiments in the image positioning method and the operation of the image positioning system, and related description is thus omitted.

Figure 9:
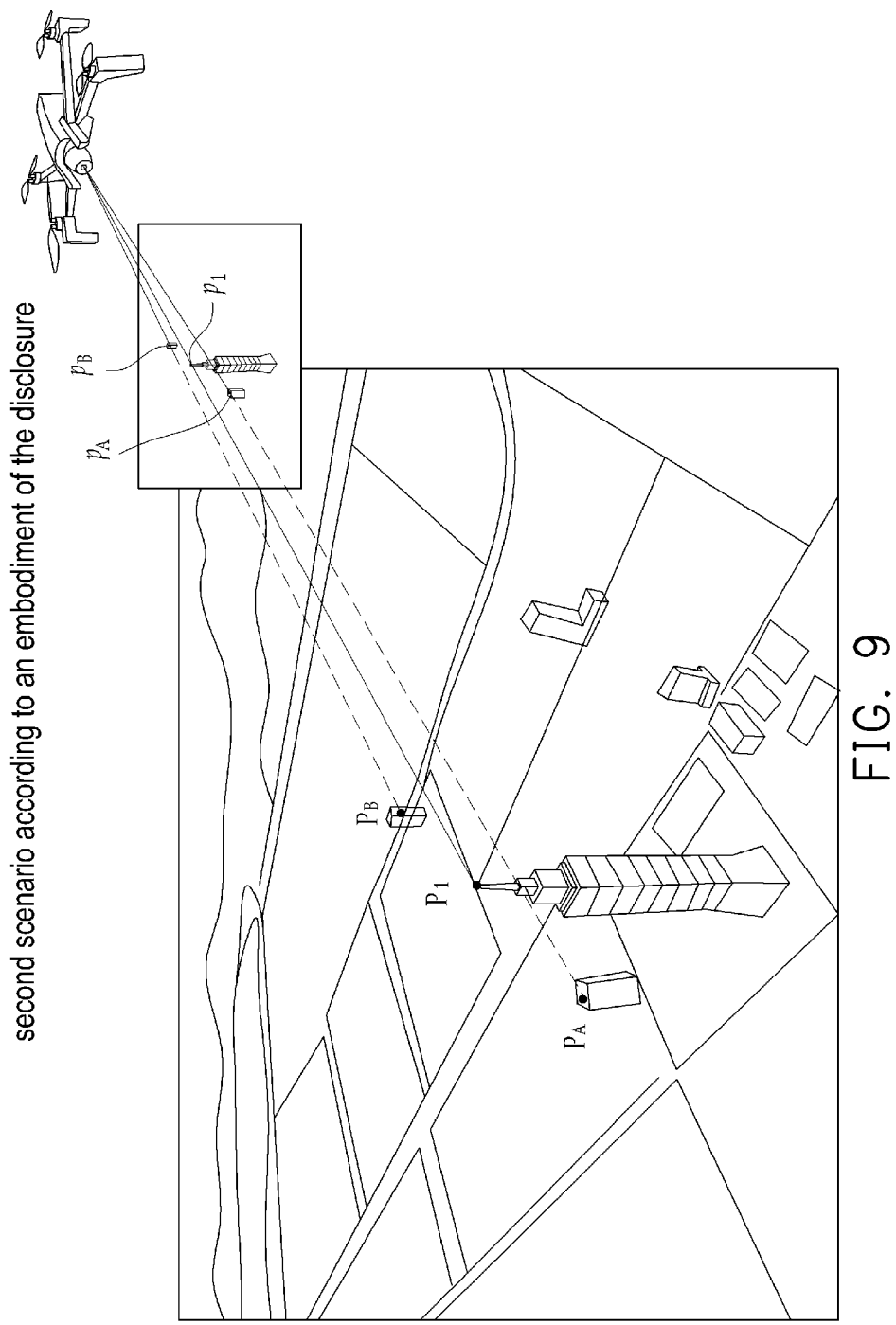
FIG. 9 is a schematic diagram illustrating a second scenario according to an embodiment of the disclosure.

FIG. 9 is a schematic diagram illustrating a second scenario according to an embodiment of the disclosure. With reference to FIG. 9, another applicable scenario of the disclosure is, for example, drones. When a drone flies in the sky, the coordinate transformation parameters are obtained through the reference points $P_A$ and $P_B$ and the projection points $p_A$ and $p_B$ corresponding to the reference points $P_A$ and $P_B$ in the image captured by the drone. Accordingly, after the drone captures an image, the processor 130 may accordingly obtain the image coordinates (e.g., $p_1$) of any target object such as a building, a car, a road tree, an electric tower, etc. in the image and transforms to the world coordinates (e.g., $P_1$) corresponding to the target object in the world coordinate system. Details of obtaining any object image in the image and transforming to the world coordinates corresponding to the object are described in the foregoing, and related description is thus omitted.

Note that in an embodiment, the processor 130 determines whether the camera 110 is powered on for the first time when the camera 110 is powered on and performs the image positioning method when the camera 110 is powered on for the first time. Alternatively, the processor 130 determines whether the position of the camera 110 is changed when the camera 110 is powered on according to the previously captured image and the image captured after the camera 110 is powered on. If the position of the camera 110 is changed, the processor 130 re-performs the image positioning method. Alternatively, the camera 110 may also re-performs the image positioning method through receiving a positioning command, and the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image positioning method, comprising:
   obtaining, by a processor, world coordinates of two reference points and image coordinates of two projection points in a first image corresponding to the two reference points, wherein the first image is obtained through a camera;
   calculating, by a processor, a plurality of coordinate transformation parameters relative to transformation between any image coordinates of two dimensions in the first image and any world coordinates of three dimensions corresponding to the camera according only to the world coordinates of the two reference points, the image coordinates of the two projection points, and world coordinates of the camera, wherein the coordinate transformation parameters comprise a focal length, a first rotation angle, a second rotation angle and a third rotation angle;
   obtaining, by a processor, a second image through the camera, wherein the second image comprises an object image corresponding to an object; and
   positioning, by a processor, world coordinates of the object according to the coordinate transformation parameters,
   wherein the step of calculating the plurality of coordinate transformation parameters relative to the transformation between any image coordinates and any world coordinates corresponding to the camera according only to the world coordinates of the two reference points, the image coordinates of the two projection points, and the world coordinates of the camera further comprises:
   determining, by a processor, a plurality of reference distances between a lens of the camera and the two reference points according to the world coordinates of the two reference points and the world coordinates of the camera, the reference distances comprising the reference distance between the lens of the camera and a first reference point, the reference distance between the lens of the camera and a second reference point, and the reference distance between the first reference point and the second reference point;

determining, by a processor, a plurality of projection distances between a first image central point and the two projection points according to image coordinates of the first image central point and the image coordinates of the two projection points, the projection distances comprising the projection distance between the first image central point and a first projection point, the projection distance between the first image central point and a second projection point, and the projection distance between the first projection point and the second projection point; and calculating, by the processor, the focal length in the coordinate transformation parameters according to the reference distances and the projection distances.

2. The image positioning method as claimed in claim 1, further comprising:

obtaining, by the processor, the first image from the camera; and determining, by the processor, resolution information corresponding to the first image and calculating image coordinates of the two projection points according to the resolution information.

3. The image positioning method as claimed in claim 1, wherein the step of calculating, by the processor, the focal length in the coordinate transformation parameters according to the reference distances and the projection distances further comprises:

determining, by the processor, correlations between the reference distances and the projection distances;

calculating by the processor, an angle of a central angle between the first image central point, the first projection point, and the second projection point; and calculating, by the processor, the focal length according to the correlations between the reference distances and the projection distances and the angle of the central angle between the first image central point, the first projection point, and the second projection point.

4. The image positioning method as claimed in claim 3, wherein the step of calculating the angle of the central angle between the first image central point, the first projection point, and the second projection point and the correlations between the reference distances and the projection distances further comprises:

calculating, by the processor, a cosine value of the central angle between the first image central point, the first projection point, and the second projection point according to the projection distances.

5. The image positioning method as claimed in claim 1, wherein the step of calculating the plurality of coordinate transformation parameters relative to the transformation between any image coordinates and any world coordinates corresponding to the camera according only to the world coordinates of the two reference points, the image coordinates of the two projection points, and the world coordinates of the camera further comprises:

calculating, by the processor, the first rotation angle and the second rotation angle in the coordinate transformation parameters according to the image coordinates corresponding to the two projection points, height differences between the two reference points and the camera, and the focal length.

6. The image positioning method as claimed in claim 5, wherein the step of calculating, by the processor, the first rotation angle and the second rotation angle in the coordinate transformation parameters according to the image coordinates corresponding to the two projection points, the height differences between the two reference points and the camera, and the focal length further comprises:

transforming, by the processor, the image coordinates of the two projection points to coordinates of the two reference points in a camera coordinate system;

determining, by the processor, coordinate values of an intermediate third coordinate axis of the two reference points in a second intermediate coordinate system; and calculating the first rotation angle and the second rotation angle according to the coordinate values of the intermediate third coordinate axis of the two reference points and the height differences between the two reference points and the camera.

7. The image positioning method as claimed in claim 1, wherein the step of calculating the plurality of coordinate transformation parameters relative to the transformation between any image coordinates and any world coordinates corresponding to the camera according only to the world coordinates of the two reference points, the image coordinates of the two projection points, and the world coordinates of the camera further comprises:

calculating, by the processor, a world projection vector by projecting a reference vector formed by the two reference points on a world plane perpendicular to a world third coordinate axis of a world coordinate system;

calculating, by the processor, an intermediate projection vector by projecting the reference vector formed by the two reference points on an intermediate plane perpendicular to an intermediate third coordinate axis of a second intermediate coordinate system; and calculating, by the processor, the third rotation angle in the coordinate transformation parameters according to the world projection vector and the intermediate projection vector.

8. The image positioning method as claimed in claim 7, wherein the step of calculating, by the processor, the third rotation angle in the coordinate transformation parameters according to the world projection vector and the intermediate projection vector further comprises:

calculating, by the processor, the third rotation angle in the coordinate transformation parameters according to an angle between the world projection vector and the intermediate projection vector.

9. The image positioning method as claimed in claim 7, wherein the step of calculating, by the processor, the third rotation angle in the coordinate transformation parameters according to the world projection vector and the intermediate projection vector further comprises:

calculating, by the processor, an intermediate angle formed between the intermediate projection vector and an intermediate first coordinate axis of the second intermediate coordinate system or between the intermediate projection vector and an intermediate second coordinate axis of the second intermediate coordinate system;

calculating, by the processor, a world angle formed between the world projection vector and a world first coordinate axis of the world coordinate system or between the world projection vector and a world second coordinate axis of the world coordinate system; and calculating, by the processor, the third rotation angle in the coordinate transformation parameters according to an angle difference between the world angle and the intermediate angle.

10. An image positioning system, comprising:
a camera;
a storage unit, storing a plurality of coordinate transformation parameters; and
a processor, connected to the camera and the storage unit, wherein the processor obtains world coordinates of two reference points and image coordinates of two projection points in a first image corresponding to the two reference points and calculates the plurality of coordinate transformation parameters relative to transformation between any image coordinates of two dimensions in the first image and any world coordinates of three dimensions corresponding to the camera according only to the world coordinates of the two reference points, the image coordinates of the two projection points, and world coordinates of the camera,
wherein the coordinate transformation parameters comprise a focal length, a first rotation angle, a second rotation angle and a third rotation angle,
wherein the first image is obtained through the camera,
wherein the processor obtains a second image through the camera, the second image comprises an object image corresponding to an object, and the processor positions world coordinates of the object according to the coordinate transformation parameters,
wherein the processor further determines a plurality of reference distances between a lens of the camera and the two reference points according to the world coordinates of the two reference points and the world coordinates of the camera, the reference distances comprise the reference distance between the lens of the camera and a first reference point, the reference distance between the lens of the camera and a second reference point, and the reference distance between the first reference point and the second reference point,
the processor further determines a plurality of projection distances between a first image central point and the two projection points according to image coordinates of the first image central point and the image coordinates of the two projection points, the projection distances comprise the projection distance between the first image central point and a first projection point, the projection distance between the first image central point and a second projection point, and the projection distance between the first projection point and the second projection point, and
the processor further calculates a focal length in the coordinate transformation parameters according to the reference distances and the projection distances.

11. The image positioning system as claimed in claim 10, wherein
the processor further obtains the first age from the camera and the processor determines resolution information corresponding to the first image and the processor calculates image coordinates of the two projection points according to the resolution information.

12. The image positioning system as claimed in claim 10, wherein
the processor further determines correlations between the reference distances and the projection distances,
the processor further calculates an angle of a central angle between the first image central point, the first projection point, and the second projection point, and
the processor further calculates the focal length according to the correlations between the reference distances and the projection distances and the angle of the central angle between the first image central point, the first projection point, and the second projection point.

13. The image positioning system as claimed in claim 12, wherein the processor further calculates a cosine value of the central angle between the first image central point, the first projection point, and the second projection point according to the projection distances.

14. The image positioning system as claimed in claim 10, wherein
the processor further calculates the first rotation angle and the second rotation angle in the coordinate transformation parameters according to the image coordinates corresponding to the two projection points, height differences between the two reference points and the camera, and the focal length.

15. The image positioning system as claimed in claim 14, wherein
the processor further transforms the image coordinates of the two projection points to coordinates of the two reference points in a camera coordinate system;
the processor further determines coordinate values of an intermediate third coordinate axis of the two reference points in a second intermediate coordinate system, and
the processor further calculates the first rotation angle and the second rotation angle according to the coordinate values of the intermediate third coordinate axis of the two reference points and the height differences between the two reference points and the camera.

16. The image positioning system as claimed in claim 10, wherein
the processor further calculates a world projection vector by projecting a reference vector formed by the two reference points on a world plane perpendicular to a world third coordinate axis of a world coordinate system,
the processor further calculates an intermediate projection vector by projecting the reference vector formed by the two reference points on an intermediate plane perpendicular to an intermediate third coordinate axis of a second intermediate coordinate system, and
the processor further calculates the third rotation angle in the coordinate transformation parameters according to the world projection vector and the intermediate projection vector.

17. The image positioning system as claimed in claim 16, wherein
the processor further calculates the third rotation angle in the coordinate transformation parameters according to an angle between the world projection vector and the intermediate projection vector.

18. The image positioning system as claimed in claim 16, wherein
the processor further calculates an intermediate angle formed between the intermediate projection vector and an intermediate first coordinate axis of the second intermediate coordinate system or between the intermediate projection vector and an intermediate second coordinate axis of the second intermediate coordinate system,
the processor further calculates a world angle formed between the world projection vector and a world first coordinate axis of the world coordinate system or between the world projection vector and a world second coordinate axis of the world coordinate system, and the processor further calculates the third rotation angle in the coordinate transformation parameters according to an angle difference between the world angle and the intermediate angle.

* * * * *